United States Patent
Margaria, Jr.

(10) Patent No.: US 11,699,310 B2
(45) Date of Patent: Jul. 11, 2023

(54) BLOCKCHAIN LEDGER VALIDATION AND SERVICE

(71) Applicant: MOTIONAL AD LLC, Boston, MA (US)

(72) Inventor: James John Margaria, Jr., Allison Park, PA (US)

(73) Assignee: Motional AD LLC, Boston, MA (US)

( * ) Notice: Subject to any disclaimer, the term of this patent is extended or adjusted under 35 U.S.C. 154(b) by 221 days.

(21) Appl. No.: 16/935,591

(22) Filed: Jul. 22, 2020

(65) Prior Publication Data

US 2021/0027557 A1    Jan. 28, 2021

Related U.S. Application Data

(60) Provisional application No. 62/877,566, filed on Jul. 23, 2019.

(51) Int. Cl.
*B60W 50/04*  (2006.01)
*G07C 5/08*   (2006.01)
(Continued)

(52) U.S. Cl.
CPC .......... *G07C 5/0841* (2013.01); *B60W 50/04* (2013.01); *G06F 16/1837* (2019.01);
(Continued)

(58) Field of Classification Search
CPC ... G07C 5/0841; G07C 5/008; G06F 16/1837; B60W 50/04; B60W 2556/15;
(Continued)

(56) References Cited

U.S. PATENT DOCUMENTS 6,263,319 B1 * 7/2001 Leatherman ........... G06Q 30/02
                                                 705/16
10,880,070 B1 * 12/2020 Delaney ................. G06F 21/64
(Continued)

FOREIGN PATENT DOCUMENTS

GB      2566741 A  *  3/2019  ............. B60K 35/00
WO   2018/162628 A1    9/2018

OTHER PUBLICATIONS

SAE On-Road Automated Vehicle Standards Committee, "SAE International's Standard J3016: Taxonomy and Definitions for Terms Related to Driving Automation Systems for On-Road Motor Vehicles", Jun. 2018, in 35 pages.
(Continued)

*Primary Examiner* — Calvin Cheung
(74) *Attorney, Agent, or Firm* — Knobbe Martens Olson & Bear LLP

(57) ABSTRACT

Disclosed are systems and techniques for using blockchain technology to maintain and validate a vehicle ledger. The technique includes receiving, at a master node in the system, a request to update a vehicle ledger associated with a first vehicle node comprising the system. If first criteria are met, the system updates the vehicle ledger, including: generating an updated version of the vehicle ledger using vehicle data stored in a master ledger associated with the master node, and transmitting the updated version of the vehicle ledger to the first vehicle node. If the first criteria are not met, the system forgoes updating the vehicle ledger. The vehicle data corresponds to a first vehicle associated with the first vehicle node. The master ledger is implemented using a blockchain that contains vehicle records for vehicles associated with the system. The blockchain includes a first block including vehicle data corresponding to the first vehicle.

26 Claims, 17 Drawing Sheets

(51) Int. Cl.
*G06F 16/182* (2019.01)
*G07C 5/00* (2006.01)
*H04L 9/32* (2006.01)
*H04L 9/00* (2022.01)
*G06Q 10/20* (2023.01)
*G06Q 10/10* (2023.01)
*G06Q 10/0875* (2023.01)

(52) U.S. Cl.
CPC ....... *G07C 5/008* (2013.01); *B60W 2050/043* (2013.01); *B60W 2556/15* (2020.02); *B60W 2556/30* (2020.02); *G06Q 10/0875* (2013.01); *G06Q 10/10* (2013.01); *G06Q 10/20* (2013.01); *H04L 9/3239* (2013.01); *H04L 9/50* (2022.05); *H04L 2209/84* (2013.01)

(58) Field of Classification Search
CPC ........ B60W 2556/30; B60W 2050/043; H04L 9/50; H04L 9/3239; H04L 2209/84; G06Q 10/0875; G06Q 10/10; G06Q 10/20

See application file for complete search history.

(56) References Cited

U.S. PATENT DOCUMENTS

| | | | |
|---|---|---|---|
| 2011/0077816 A1* | 3/2011 | Biondo | G07C 5/008 701/31.4 |
| 2014/0059534 A1* | 2/2014 | Daum | G06F 8/65 717/172 |
| 2014/0067152 A1* | 3/2014 | Swanson | H04W 4/46 701/1 |
| 2019/0050220 A1* | 2/2019 | Daum | H04L 67/12 |
| 2019/0066061 A1* | 2/2019 | Rencher | G06Q 10/06315 |
| 2019/0187971 A1* | 6/2019 | Wang | H04W 12/06 |
| 2019/0332702 A1* | 10/2019 | Manamohan | H04L 9/50 |
| 2019/0332955 A1* | 10/2019 | Manamohan | G06K 9/6256 |
| 2020/0026619 A1* | 1/2020 | Kaji | G06F 21/64 |
| 2020/0073651 A1* | 3/2020 | Rodriguez Bravo | H04W 4/40 |
| 2020/0313851 A1* | 10/2020 | Mondello | G06F 3/0673 |

OTHER PUBLICATIONS

International Preliminary Report on Patentability issued for Application No. PCT/US2020/043096, dated Jan. 25, 2022.
Blockchain—Wikipedia, Online available at: https://en.wikipedia.org/w/index.php?title=Blockchain&oldid=881903704, Feb. 5, 2019, 19 pages.
International Search Report and Written Opinion received for PCT Patent Application No. PCT/US2020/043096, dated Nov. 4, 2020, 13 pages.

* cited by examiner

FIG. 14a

| Vehicle | Component | Revision Level | User | Born on Date | Service Date | Activity | Block |
|---|---|---|---|---|---|---|---|
| 41 | Comp 1 | v4r11.12 | xbbch2 | 9/1/2018 | | Add | 101 |
| 41 | Comp 2 | v1.113 | y49cc | 9/1/2018 | | Add | 102 |
| 41 | Comp 3 | v17r3.33 | c3yy476 | 9/1/2018 | | Add | 103 |
| ... | ... | ... | ... | ... | ... | ... | ... |
| 41 | Comp 50 | v1r2.0 | xbbch2 | 9/1/2018 | | Add | 150 |
| 41 | Comp 50 | v22r312 | z3m5 | 11/1/2018 | 11/15/2018 | Removed | 151 |
| 41 | Comp 50 | 1134234 | z3m5 | 11/1/2018 | 11/15/2018 | Replacement | 152 |

FIG. 14b

| Vehicle | Component | Revision Level | User | Born on Date | Service Date | Activity | Block |
|---|---|---|---|---|---|---|---|
| 41 | Comp 1 | v4r11.12 | xbbch2 | 9/1/2018 | | Add | 101 |
| 41 | Comp 2 | v1.113 | y49cc | 9/1/2018 | | Add | 102 |
| 41 | Comp 3 | v17r3.33 | c3yy476 | 9/1/2018 | | Add | 103 |
| ... | ... | ... | ... | ... | ... | ... | ... |
| 41 | Comp 50 | v1r2.0 | xbbch2 | 9/1/2018 | | Add | 150 |
| 41 | Comp 50 | v22r312 | z3m5 | 11/1/2018 | 11/15/2018 | Removed | 151 |
| 41 | Comp 50 | 1134234 | z3m5 | 11/1/2018 | 11/15/2018 | Replacement | 152 |
| 41 | Comp 51 | V1.0r1.223268 | xbbch2 | 12/14/2018 | | Add | 153 |

| Vehicle | Component | Revision Level | User | Born on Date | Service Date | Activity | Block |
|---|---|---|---|---|---|---|---|
| 1 | Comp 1 | v4r11.1 | xbbch2 | 1/1/2018 | | Add | 1 |
| 1 | Comp 2 | v1.11 | y49cc | 1/1/2018 | | Add | 2 |
| 1 | Comp 3 | v17r3 | c3yy476 | 1/1/2018 | | Add | 3 |
| ... | ... | ... | ... | ... | ... | ... | ... |
| 40 | Comp 50 | v7r12.7 | y49cc | 9/20/2018 | | Replacement | 100 |
| 41 | Comp 1 | v4r11.12 | xbbch2 | 9/1/2018 | | Add | 101 |
| 41 | Comp 2 | v1.113 | y49cc | 9/1/2018 | | Add | 102 |
| 41 | Comp 3 | v17r3.33 | c3yy476 | 9/1/2018 | | Add | 103 |
| ... | ... | ... | ... | ... | ... | ... | ... |
| 41 | Comp 50 | v1r2.0 | xbbch2 | 9/1/2018 | | Add | 150 |
| 41 | Comp 50 | v22r312 | z3m5 | 11/1/2018 | 11/15/2018 | Removed | 151 |
| 41 | Comp 50 | 1134234 | z3m5 | 11/1/2018 | 11/15/2018 | Replacement | 152 |

FIG. 15a

| Vehicle | Component | Revision Level | User | Born on Date | Service Date | Activity | Block |
|---|---|---|---|---|---|---|---|
| 1 | Comp 1 | v4r11.1 | xbbch2 | 1/1/2018 | | Add | 1 |
| 1 | Comp 2 | v1.11 | y49cc | 1/1/2018 | | Add | 2 |
| 1 | Comp 3 | v17r3 | c3yy476 | 1/1/2018 | | Add | 3 |
| ... | ... | ... | ... | ... | ... | ... | ... |
| 40 | Comp 50 | v7r12.7 | y49cc | 9/20/2018 | | Replacement | 100 |
| 41 | Comp 1 | v4r11.12 | xbbch2 | 9/1/2018 | | Add | 101 |
| 41 | Comp 2 | v1.113 | y49cc | 9/1/2018 | | Add | 102 |
| 41 | Comp 3 | v17r3.33 | c3yy476 | 9/1/2018 | | Add | 103 |
| ... | ... | ... | ... | ... | ... | ... | ... |
| 41 | Comp 50 | v1r2.0 | xbbch2 | 9/1/2018 | | Add | 150 |
| 41 | Comp 50 | v22r312 | z3m5 | 11/1/2018 | 11/15/2018 | Removed | 151 |
| 41 | Comp 50 | 1134234 | z3m5 | 11/1/2018 | 11/15/2018 | Replacement | 152 |
| 41 | Comp 51 | V1.0r1.223268 | xbbch2 | 12/14/2018 | | Add | 153 |

FIG. 15b

BLOCKCHAIN LEDGER VALIDATION AND SERVICE

CROSS-REFERENCE TO RELATED APPLICATIONS

This application claims the benefit of U.S. Provisional Patent Application 62/877,566, entitled "Blockchain Ledger Validation and Service," filed Jul. 23, 2019, the content of which is incorporated herein by reference in its entirety.

FIELD OF THE INVENTION

This description relates to using blockchain technology to maintain and validate a vehicle activity ledger.

BACKGROUND

Vehicle activity ledgers can be used to track data corresponding to vehicles in a network. For example, the ledgers can include records of system components, maintenance logs, software revision levels, and other information pertinent to a vehicle.

SUMMARY

The subject matter described in this specification is directed to a computer system and techniques for using blockchain technology to maintain and validate a vehicle activity ledger (also referred to herein as a "vehicle ledger"). Generally, the computer system is configured to provide a distributed network architecture that can be used to maintain vehicle ledgers using the disclosed technique. The technique includes: receiving, at a master node in the distributed network architecture, a request to update a vehicle ledger associated with a first vehicle node of a plurality of vehicle nodes comprising the distributed network architecture; in accordance with a determination that first criteria are met, updating the vehicle ledger, including: generating an updated version of the vehicle ledger using vehicle data stored in a master ledger associated with the master node, wherein the vehicle data corresponds to a first vehicle associated with the first vehicle node, and wherein the master ledger is implemented using a blockchain that contains vehicle records for a plurality of vehicles associated with the distributed network architecture, the blockchain including a first block including the vehicle data corresponding to the first vehicle; and transmitting the updated version of the vehicle ledger to the first vehicle node; and in accordance with a determination that the first criteria are not met, forgoing updating the vehicle ledger.

These and other aspects, features, and implementations can be expressed as methods, apparatuses, systems, components, program products, means or steps for performing a function, and in other ways.

These and other aspects, features, and implementations will become apparent from the following descriptions, including the claims.

BRIEF DESCRIPTION OF THE DRAWINGS

FIGS. 14a and 14b show an example vehicle ledger.

FIGS. 15a and 15b show an example master ledger.

DETAILED DESCRIPTION

Figure 1:
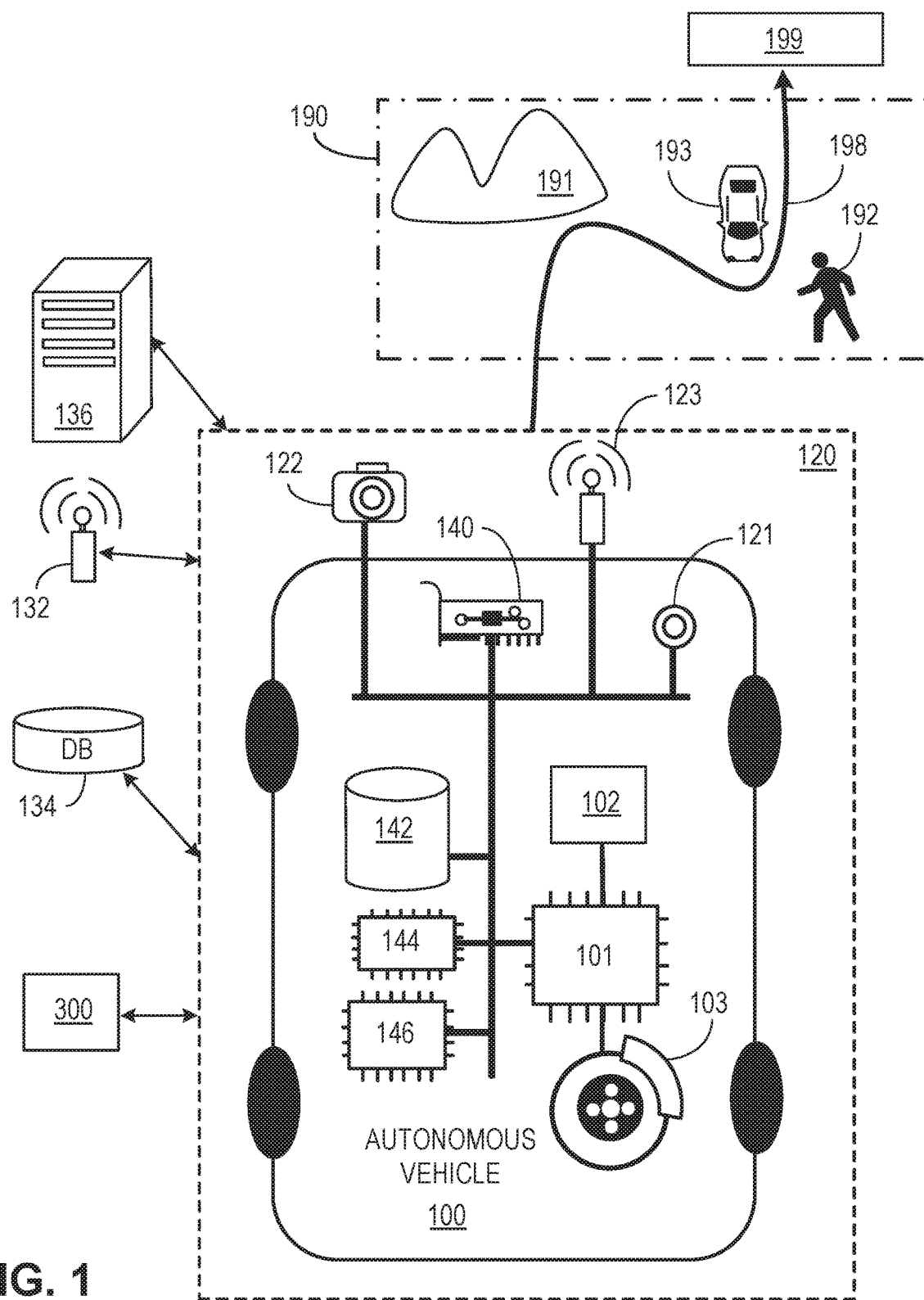
FIG. 1 shows an example of an autonomous vehicle having autonomous capability.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

In the drawings, specific arrangements or orderings of schematic elements, such as those representing devices, modules, instruction blocks and data elements, are shown for ease of description. However, it should be understood by those skilled in the art that the specific ordering or arrangement of the schematic elements in the drawings is not meant to imply that a particular order or sequence of processing, or separation of processes, is required. Further, the inclusion of a schematic element in a drawing is not meant to imply that such element is required in all embodiments or that the features represented by such element may not be included in or combined with other elements in some embodiments.

Further, in the drawings, where connecting elements, such as solid or dashed lines or arrows, are used to illustrate a connection, relationship, or association between or among two or more other schematic elements, the absence of any such connecting elements is not meant to imply that no connection, relationship, or association can exist. In other words, some connections, relationships, or associations between elements are not shown in the drawings so as not to obscure the disclosure. In addition, for ease of illustration, a single connecting element is used to represent multiple connections, relationships or associations between elements. For example, where a connecting element represents a communication of signals, data, or instructions, it should be understood by those skilled in the art that such element represents one or multiple signal paths (e.g., a bus), as may be needed, to affect the communication.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

Several features are described hereafter that can each be used independently of one another or with any combination of other features. However, any individual feature may not address any of the problems discussed above or might only address one of the problems discussed above. Some of the problems discussed above might not be fully addressed by any of the features described herein. Although headings are provided, information related to a particular heading, but not found in the section having that heading, may also be found elsewhere in this description. Embodiments are described herein according to the following outline:

1. General Overview
2. Hardware Overview
3. Autonomous Vehicle Architecture
4. Autonomous Vehicle Inputs
5. Autonomous Vehicle Planning
6. Autonomous Vehicle Control
7. Using Blockchain Technology to Maintain and Validate Vehicle Ledgers
8. Example Process for Using Blockchain Technology to Maintain and Validate a Vehicle Ledger General Overview Autonomous vehicles driving in complex environments (e.g., an urban environment) pose a great technological challenge. In order for autonomous vehicles to navigate these environments, the vehicles detect various types of objects such as vehicles, pedestrians, and bikes in real-time using sensors such as LIDAR or RADAR. In order to facilitate operation of autonomous vehicles in these environments, a network is used to maintain vehicle ledgers containing data recorded for one or more of the autonomous vehicles. Existing solutions for maintaining vehicle ledgers are vulnerable to various security threats and lack transparency, security, or auditability needed for industrialization. For example, new components or software can be added to the configuration of a vehicle by staff or a third party without proper authorization. Additionally, components in the vehicle can be hacked by a third party to, for example, change the software and/or revision level or enable other bad actor activities.

The present disclosure provides one or more embodiments for maintaining vehicle ledgers using a blockchain architecture. The disclosed embodiments include a system and techniques for using a blockchain architecture to maintain and validate vehicle ledgers for one or more autonomous vehicles. Using blockchain technology enables a ledger of activity that cannot be easily changed and is less susceptible to hacking. Accordingly, these embodiments provide a system and methods for maintaining and validating vehicle ledgers that is redundant, immutable, and secure.

Hardware Overview

FIG. 1 shows an example of an autonomous vehicle 100 having autonomous capability.

As used herein, the term "autonomous capability" refers to a function, feature, or facility that enables a vehicle to be partially or fully operated without real-time human intervention, including without limitation fully autonomous vehicles, highly autonomous vehicles, and conditionally autonomous vehicles.

As used herein, an autonomous vehicle (AV) is a vehicle that possesses autonomous capability.

As used herein, "vehicle" includes means of transportation of goods or people. For example, cars, buses, trains, airplanes, drones, trucks, boats, ships, submersibles, dirigibles, etc. A driverless car is an example of a vehicle.

As used herein, "trajectory" refers to a path or route to navigate an AV from a first spatiotemporal location to second spatiotemporal location. In an embodiment, the first spatiotemporal location is referred to as the initial or starting location and the second spatiotemporal location is referred to as the destination, final location, goal, goal position, or goal location. In some examples, a trajectory is made up of one or more segments (e.g., sections of road) and each segment is made up of one or more blocks (e.g., portions of a lane or intersection). In an embodiment, the spatiotemporal locations correspond to real world locations. For example, the spatiotemporal locations are pick up or drop-off locations to pick up or drop-off persons or goods.

As used herein, "sensor(s)" includes one or more hardware components that detect information about the environment surrounding the sensor. Some of the hardware components can include sensing components (e.g., image sensors, biometric sensors), transmitting and/or receiving components (e.g., laser or radio frequency wave transmitters and receivers), electronic components such as analog-to-digital converters, a data storage device (such as a RAM and/or a nonvolatile storage), software or firmware components and data processing components such as an ASIC (application-specific integrated circuit), a microprocessor and/or a microcontroller.

As used herein, a "scene description" is a data structure (e.g., list) or data stream that includes one or more classified or labeled objects detected by one or more sensors on the AV vehicle or provided by a source external to the AV.

As used herein, a "road" is a physical area that can be traversed by a vehicle, and may correspond to a named thoroughfare (e.g., city street, interstate freeway, etc.) or may correspond to an unnamed thoroughfare (e.g., a driveway in a house or office building, a section of a parking lot, a section of a vacant lot, a dirt path in a rural area, etc.). Because some vehicles (e.g., 4-wheel-drive pickup trucks, sport utility vehicles, etc.) are capable of traversing a variety of physical areas not specifically adapted for vehicle travel, a "road" may be a physical area not formally defined as a thoroughfare by any municipality or other governmental or administrative body.

As used herein, a "lane" is a portion of a road that can be traversed by a vehicle, and may correspond to most or all of the space between lane markings, or may correspond to only some (e.g., less than 50%) of the space between lane markings. For example, a road having lane markings spaced far apart might accommodate two or more vehicles between the markings, such that one vehicle can pass the other without traversing the lane markings, and thus could be interpreted as having a lane narrower than the space between the lane markings, or having two lanes between the lane markings. A lane could also be interpreted in the absence of lane markings. For example, a lane may be defined based on physical features of an environment, e.g., rocks and trees along a thoroughfare in a rural area.

"One or more" includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact, unless specified otherwise.

The terminology used in the description of the various described embodiments herein is for the purpose of describing particular embodiments only and is not intended to be limiting. As used in the description of the various described embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this description, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

As used herein, an AV system refers to the AV along with the array of hardware, software, stored data, and data generated in real-time that supports the operation of the AV. In an embodiment, the AV system is incorporated within the AV. In an embodiment, the AV system is spread across several locations. For example, some of the software of the AV system is implemented on a cloud computing environment similar to cloud computing environment 200 described below with respect to FIG. 2.

In general, this document describes technologies applicable to any vehicles that have one or more autonomous capabilities including fully autonomous vehicles, highly autonomous vehicles, and conditionally autonomous vehicles, such as so-called Level 5, Level 4 and Level 3 vehicles, respectively (see SAE International's standard J3016: Taxonomy and Definitions for Terms Related to On-Road Motor Vehicle Automated Driving Systems, which is incorporated by reference in its entirety, for more details on the classification of levels of autonomy in vehicles). The technologies described in this document are also applicable to partially autonomous vehicles and driver assisted vehicles, such as so-called Level 2 and Level 1 vehicles (see SAE International's standard J3016: Taxonomy and Definitions for Terms Related to On-Road Motor Vehicle Automated Driving Systems). In an embodiment, one or more of the Level 1, 2, 3, 4 and 5 vehicle systems may automate certain vehicle operations (e.g., steering, braking, and using maps) under certain operating conditions based on processing of sensor inputs. The technologies described in this document can benefit vehicles in any levels, ranging from fully autonomous vehicles to human-operated vehicles.

Referring to FIG. 1, an AV system 120 operates the AV 100 along a trajectory 198 through an environment 190 to a destination 199 (sometimes referred to as a final location) while avoiding objects (e.g., natural obstructions 191, vehicles 193, pedestrians 192, cyclists, and other obstacles) and obeying rules of the road (e.g., rules of operation or driving preferences).

In an embodiment, the AV system 120 includes devices 101 that are instrumented to receive and act on operational commands from the computer processors 146. In an embodiment, computing processors 146 are similar to the processor 304 described below in reference to FIG. 3. Examples of devices 101 include a steering control 102, brakes 103, gears, accelerator pedal or other acceleration control mechanisms, windshield wipers, side-door locks, window controls, and turn-indicators.

In an embodiment, the AV system 120 includes sensors 121 for measuring or inferring properties of state or condition of the AV 100, such as the AV's position, linear and angular velocity and acceleration, and heading (e.g., an orientation of the leading end of AV 100). Example of sensors 121 are GPS, inertial measurement units (IMU) that measure both vehicle linear accelerations and angular rates, wheel speed sensors for measuring or estimating wheel slip ratios, wheel brake pressure or braking torque sensors, engine torque or wheel torque sensors, and steering angle and angular rate sensors.

In an embodiment, the sensors 121 also include sensors for sensing or measuring properties of the AV's environment. For example, monocular or stereo video cameras 122 in the visible light, infrared or thermal (or both) spectra, LiDAR 123, RADAR, ultrasonic sensors, time-of-flight (TOF) depth sensors, speed sensors, temperature sensors, humidity sensors, and precipitation sensors.

In an embodiment, the AV system 120 includes a data storage unit 142 and memory 144 for storing machine instructions associated with computer processors 146 or data collected by sensors 121. In an embodiment, the data storage unit 142 is similar to the ROM 308 or storage device 310 described below in relation to FIG. 3. In an embodiment, memory 144 is similar to the main memory 306 described below. In an embodiment, the data storage unit 142 and memory 144 store historical, real-time, and/or predictive information about the environment 190. In an embodiment, the stored information includes maps, driving performance, traffic congestion updates or weather conditions. In an embodiment, data relating to the environment 190 is transmitted to the AV 100 via a communications channel from a remotely located database 134.

In an embodiment, the AV system 120 includes communications devices 140 for communicating measured or inferred properties of other vehicles' states and conditions, such as positions, linear and angular velocities, linear and angular accelerations, and linear and angular headings to the AV 100. These devices include Vehicle-to-Vehicle (V2V) and Vehicle-to-Infrastructure (V2I) communication devices and devices for wireless communications over point-to-point or ad hoc networks or both. In an embodiment, the communications devices 140 communicate across the electromagnetic spectrum (including radio and optical communications) or other media (e.g., air and acoustic media). A combination of Vehicle-to-Vehicle (V2V) Vehicle-to-Infrastructure (V2I) communication (and, in some embodiments, one or more other types of communication) is sometimes referred to as Vehicle-to-Everything (V2X) communication. V2X communication typically conforms to one or more communications standards for communication with, between, and among autonomous vehicles.

In an embodiment, the communication devices 140 include communication interfaces. For example, wired, wireless, WiMAX, WiFi, Bluetooth, satellite, cellular, optical, near field, infrared, or radio interfaces. The communication interfaces transmit data from a remotely located database 134 to AV system 120. In an embodiment, the remotely located database 134 is embedded in a cloud computing environment 200 as described in FIG. 2. The communication interfaces 140 transmit data collected from sensors 121 or other data related to the operation of AV 100 to the remotely located database 134. In an embodiment, communication interfaces 140 transmit information that relates to teleoperations to the AV 100. In some embodiments, the AV 100 communicates with other remote (e.g., "cloud") servers 136.

In an embodiment, the remotely located database 134 also stores and transmits digital data (e.g., storing data such as road and street locations). Such data is stored on the memory 144 on the AV 100, or transmitted to the AV 100 via a communications channel from the remotely located database 134.

In an embodiment, the remotely located database 134 stores and transmits historical information about driving properties (e.g., speed and acceleration profiles) of vehicles that have previously traveled along trajectory 198 at similar times of day. In one implementation, such data may be stored on the memory 144 on the AV 100, or transmitted to the AV 100 via a communications channel from the remotely located database 134.

Computing devices 146 located on the AV 100 algorithmically generate control actions based on both real-time sensor data and prior information, allowing the AV system 120 to execute its autonomous driving capabilities.

In an embodiment, the AV system 120 includes computer peripherals 132 coupled to computing devices 146 for providing information and alerts to, and receiving input from, a user (e.g., an occupant or a remote user) of the AV 100. In an embodiment, peripherals 132 are similar to the display 312, input device 314, and cursor controller 316 discussed below in reference to FIG. 3. The coupling is wireless or wired. Any two or more of the interface devices may be integrated into a single device.

Figure 2:
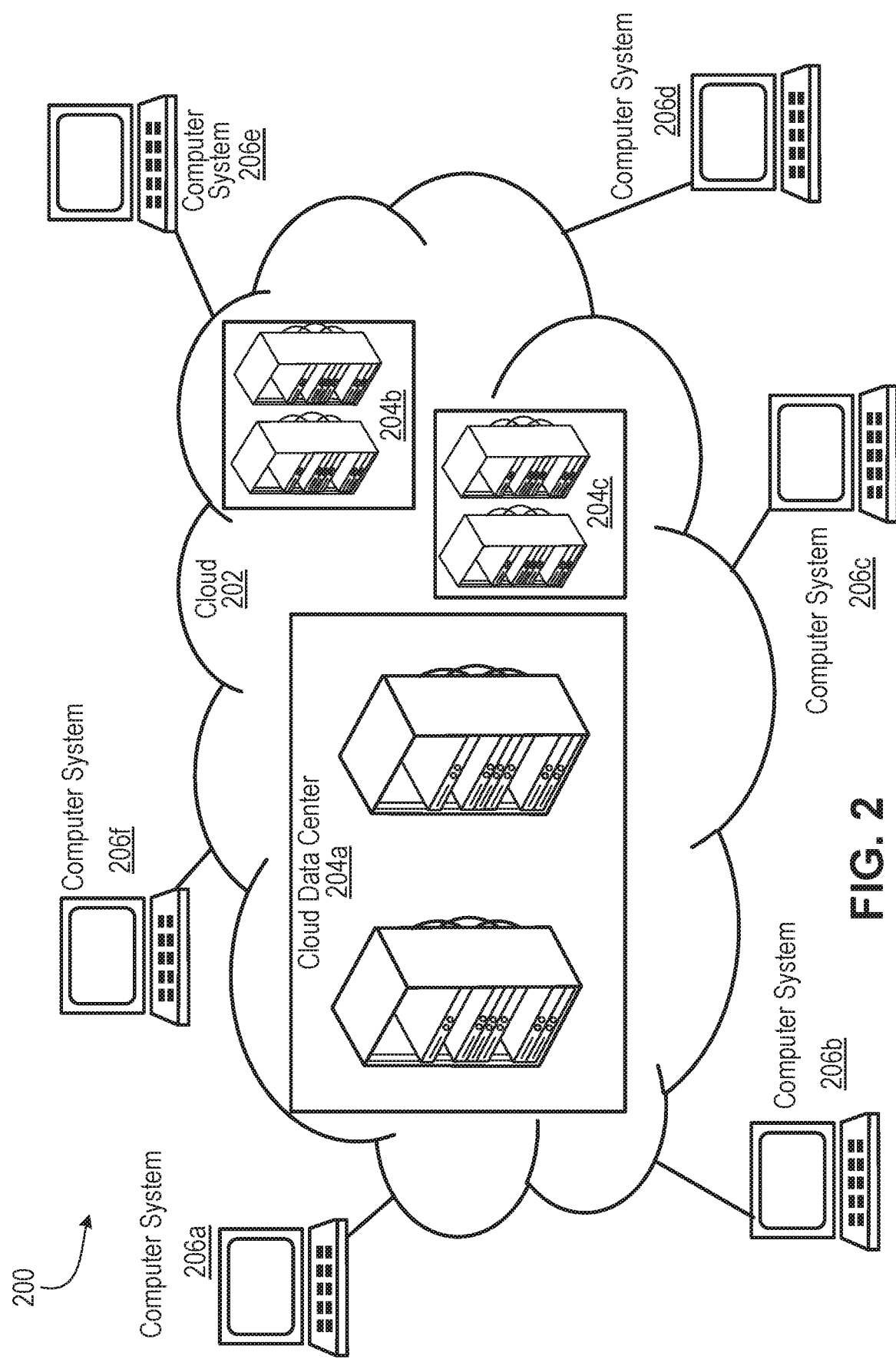
FIG. 2 illustrates an example "cloud" computing environment.

FIG. 2 illustrates an example "cloud" computing environment. Cloud computing is a model of service delivery for enabling convenient, on-demand network access to a shared pool of configurable computing resources (e.g., networks, network bandwidth, servers, processing, memory, storage, applications, virtual machines, and services). In typical cloud computing systems, one or more large cloud data centers house the machines used to deliver the services provided by the cloud. Referring now to FIG. 2, the cloud computing environment 200 includes cloud data centers 204a, 204b, and 204c that are interconnected through the cloud 202. Data centers 204a, 204b, and 204c provide cloud computing services to computer systems 206a, 206b, 206c, 206d, 206e, and 206f connected to cloud 202.

The cloud computing environment 200 includes one or more cloud data centers. In general, a cloud data center, for example the cloud data center 204a shown in FIG. 2, refers to the physical arrangement of servers that make up a cloud, for example the cloud 202 shown in FIG. 2, or a particular portion of a cloud. For example, servers are physically arranged in the cloud datacenter into rooms, groups, rows, and racks. A cloud datacenter has one or more zones, which include one or more rooms of servers. Each room has one or more rows of servers, and each row includes one or more racks. Each rack includes one or more individual server nodes. In some implementation, servers in zones, rooms, racks, and/or rows are arranged into groups based on physical infrastructure requirements of the datacenter facility, which include power, energy, thermal, heat, and/or other requirements. In an embodiment, the server nodes are similar to the computer system described in FIG. 3. The data center 204a has many computing systems distributed through many racks.

The cloud 202 includes cloud data centers 204a, 204b, and 204c along with the network and networking resources (for example, networking equipment, nodes, routers, switches, and networking cables) that interconnect the cloud data centers 204a, 204b, and 204c and help facilitate the computing systems' 206a-f access to cloud computing services. In an embodiment, the network represents any combination of one or more local networks, wide area networks, or internetworks coupled using wired or wireless links deployed using terrestrial or satellite connections. Data exchanged over the network, is transferred using any number of network layer protocols, such as Internet Protocol (IP), Multiprotocol Label Switching (MPLS), Asynchronous Transfer Mode (ATM), Frame Relay, etc. Furthermore, in embodiments where the network represents a combination of multiple sub-networks, different network layer protocols are used at each of the underlying sub-networks. In some embodiments, the network represents one or more interconnected internetworks, such as the public Internet.

The computing systems 206a-f or cloud computing services consumers are connected to the cloud 202 through network links and network adapters. In an embodiment, the computing systems 206a-f are implemented as various computing devices, for example servers, desktops, laptops, tablet, smartphones, Internet of Things (IoT) devices, autonomous vehicles (including, cars, drones, shuttles, trains, buses, etc.) and consumer electronics. In an embodiment, the computing systems 206a-f are implemented in or as a part of other systems.

Figure 3:
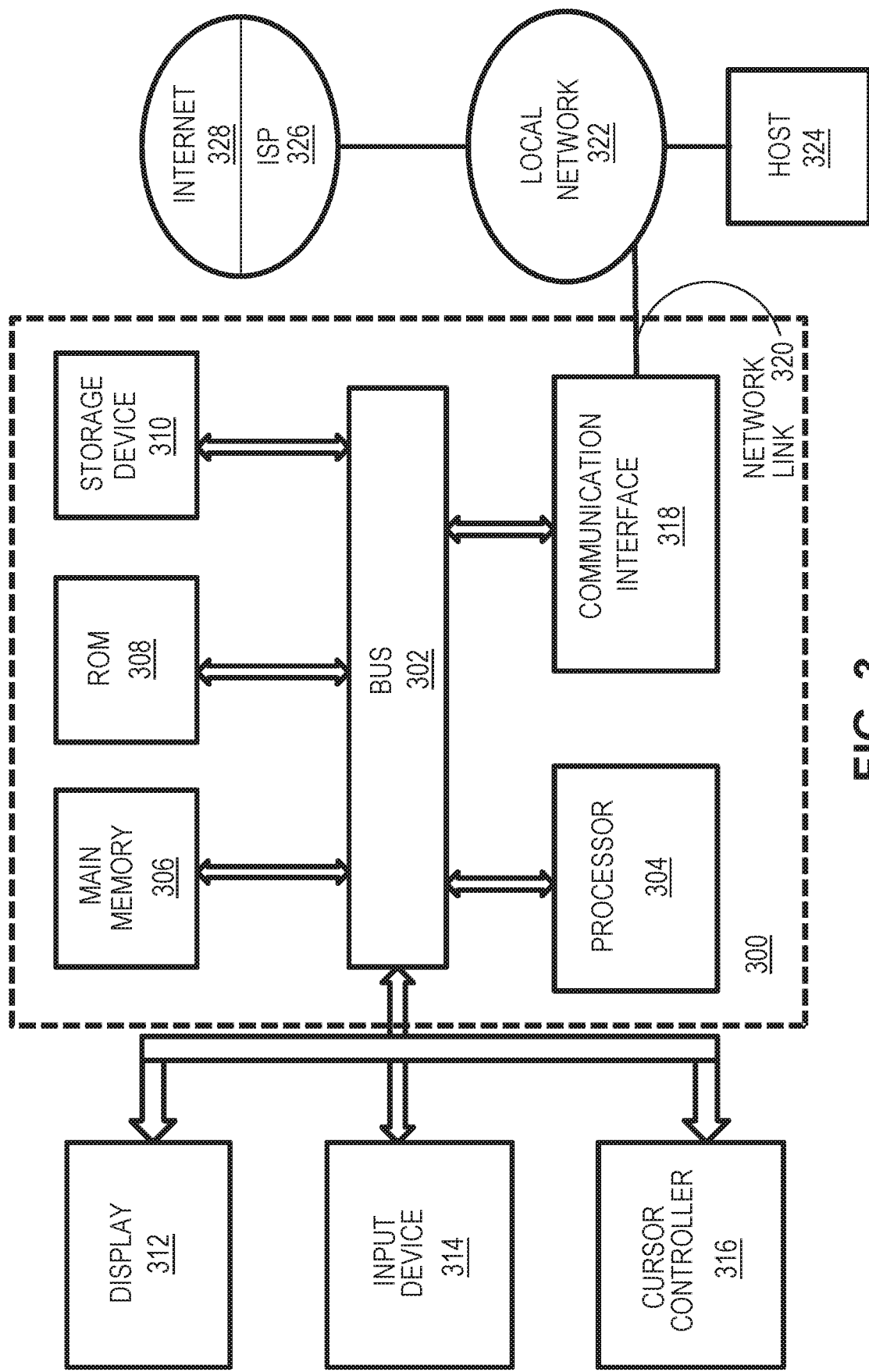
FIG. 3 illustrates a computer system.

FIG. 3 illustrates a computer system 300. In an implementation, the computer system 300 is a special purpose computing device. The special-purpose computing device is hard-wired to perform the techniques or includes digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. In various embodiments, the special-purpose computing devices are desktop computer systems, portable computer systems, handheld devices, network devices or any other device that incorporates hard-wired and/or program logic to implement the techniques.

In an embodiment, the computer system 300 includes a bus 302 or other communication mechanism for communicating information, and a hardware processor 304 coupled with a bus 302 for processing information. The hardware processor 304 is, for example, a general-purpose microprocessor. The computer system 300 also includes a main memory 306, such as a random-access memory (RAM) or other dynamic storage device, coupled to the bus 302 for storing information and instructions to be executed by processor 304. In one implementation, the main memory 306 is used for storing temporary variables or other intermediate information during execution of instructions to be executed by the processor 304. Such instructions, when stored in non-transitory storage media accessible to the processor 304, render the computer system 300 into a special-purpose machine that is customized to perform the operations specified in the instructions.

In an embodiment, the computer system 300 further includes a read only memory (ROM) 308 or other static storage device coupled to the bus 302 for storing static information and instructions for the processor 304. A storage device 310, such as a magnetic disk, optical disk, solid-state drive, or three-dimensional cross point memory is provided and coupled to the bus 302 for storing information and instructions.

In an embodiment, the computer system 300 is coupled via the bus 302 to a display 312, such as a cathode ray tube (CRT), a liquid crystal display (LCD), plasma display, light emitting diode (LED) display, or an organic light emitting diode (OLED) display for displaying information to a computer user. An input device 314, including alphanumeric and other keys, is coupled to bus 302 for communicating information and command selections to the processor 304. Another type of user input device is a cursor controller 316, such as a mouse, a trackball, a touch-enabled display, or cursor direction keys for communicating direction information and command selections to the processor 304 and for controlling cursor movement on the display 312. This input device typically has two degrees of freedom in two axes, a first axis (e.g., x-axis) and a second axis (e.g., y-axis), that allows the device to specify positions in a plane.

According to one embodiment, the techniques herein are performed by the computer system 300 in response to the processor 304 executing one or more sequences of one or more instructions contained in the main memory 306. Such instructions are read into the main memory 306 from another storage medium, such as the storage device 310. Execution of the sequences of instructions contained in the main memory 306 causes the processor 304 to perform the process steps described herein. In alternative embodiments, hard-wired circuitry is used in place of or in combination with software instructions.

The term "storage media" as used herein refers to any non-transitory media that store data and/or instructions that cause a machine to operate in a specific fashion. Such storage media includes non-volatile media and/or volatile media. Non-volatile media includes, for example, optical disks, magnetic disks, solid-state drives, or three-dimensional cross point memory, such as the storage device 310. Volatile media includes dynamic memory, such as the main memory 306. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NV-RAM, or any other memory chip or cartridge.

Storage media is distinct from but may be used in conjunction with transmission media. Transmission media participates in transferring information between storage media. For example, transmission media includes coaxial cables, copper wire and fiber optics, including the wires that comprise the bus 302. Transmission media can also take the form of acoustic or light waves, such as those generated during radio-wave and infrared data communications.

In an embodiment, various forms of media are involved in carrying one or more sequences of one or more instructions to the processor 304 for execution. For example, the instructions are initially carried on a magnetic disk or solid-state drive of a remote computer. The remote computer loads the instructions into its dynamic memory and send the instructions over a telephone line using a modem. A modem local to the computer system 300 receives the data on the telephone line and use an infrared transmitter to convert the data to an infrared signal. An infrared detector receives the data carried in the infrared signal and appropriate circuitry places the data on the bus 302. The bus 302 carries the data to the main memory 306, from which processor 304 retrieves and executes the instructions. The instructions received by the main memory 306 may optionally be stored on the storage device 310 either before or after execution by processor 304.

The computer system 300 also includes a communication interface 318 coupled to the bus 302. The communication interface 318 provides a two-way data communication coupling to a network link 320 that is connected to a local network 322. For example, the communication interface 318 is an integrated service digital network (ISDN) card, cable modem, satellite modem, or a modem to provide a data communication connection to a corresponding type of telephone line. As another example, the communication interface 318 is a local area network (LAN) card to provide a data communication connection to a compatible LAN. In some implementations, wireless links are also implemented. In any such implementation, the communication interface 318 sends and receives electrical, electromagnetic, or optical signals that carry digital data streams representing various types of information.

The network link 320 typically provides data communication through one or more networks to other data devices. For example, the network link 320 provides a connection through the local network 322 to a host computer 324 or to a cloud data center or equipment operated by an Internet Service Provider (ISP) 326. The ISP 326 in turn provides data communication services through the world-wide packet data communication network now commonly referred to as the "Internet" 328. The local network 322 and Internet 328 both use electrical, electromagnetic or optical signals that carry digital data streams. The signals through the various networks and the signals on the network link 320 and through the communication interface 318, which carry the digital data to and from the computer system 300, are example forms of transmission media. In an embodiment, the network 320 contains the cloud 202 or a part of the cloud 202 described above.

The computer system 300 sends messages and receives data, including program code, through the network(s), the network link 320, and the communication interface 318. In an embodiment, the computer system 300 receives code for processing. The received code is executed by the processor 304 as it is received, and/or stored in storage device 310, or other non-volatile storage for later execution.

Autonomous Vehicle Architecture

Figure 4:
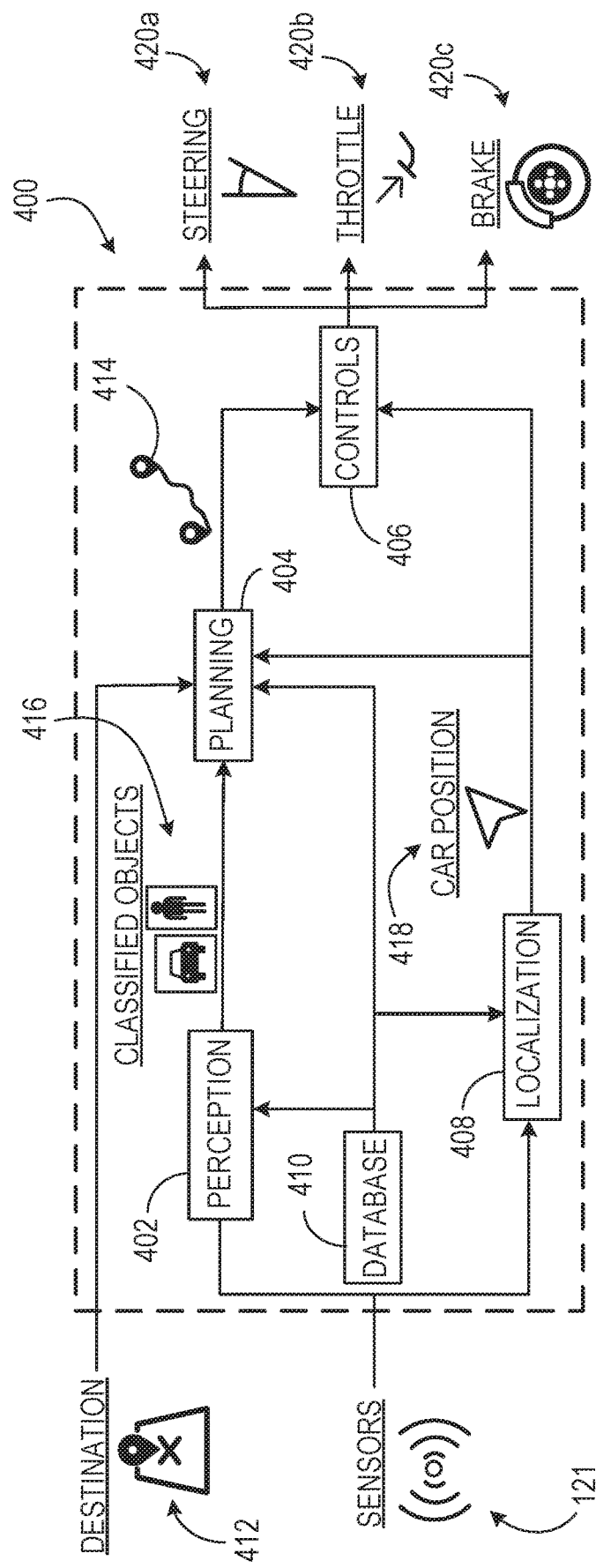
FIG. 4 shows an example architecture for an autonomous vehicle.

FIG. 4 shows an example architecture 400 for an autonomous vehicle (e.g., the AV 100 shown in FIG. 1). The architecture 400 includes a perception module 402 (sometimes referred to as a perception circuit), a planning module 404 (sometimes referred to as a planning circuit), a control module 406 (sometimes referred to as a control circuit), a localization module 408 (sometimes referred to as a localization circuit), and a database module 410 (sometimes referred to as a database circuit). Each module plays a role in the operation of the AV 100. Together, the modules 402, 404, 406, 408, and 410 may be part of the AV system 120 shown in FIG. 1. In some embodiments, any of the modules 402, 404, 406, 408, and 410 is a combination of computer software (e.g., executable code stored on a computer-readable medium) and computer hardware (e.g., one or more microprocessors, microcontrollers, application-specific integrated circuits [ASICs]), hardware memory devices, other types of integrated circuits, other types of computer hardware, or a combination of any or all of these things).

In use, the planning module 404 receives data representing a destination 412 and determines data representing a trajectory 414 (sometimes referred to as a route) that can be traveled by the AV 100 to reach (e.g., arrive at) the destination 412. In order for the planning module 404 to determine the data representing the trajectory 414, the planning module 404 receives data from the perception module 402, the localization module 408, and the database module 410.

The perception module 402 identifies nearby physical objects using one or more sensors 121, e.g., as also shown in FIG. 1. The objects are classified (e.g., grouped into types such as pedestrian, bicycle, automobile, traffic sign, etc.) and a scene description including the classified objects 416 is provided to the planning module 404.

The planning module 404 also receives data representing the AV position 418 from the localization module 408. The localization module 408 determines the AV position by using data from the sensors 121 and data from the database module 410 (e.g., a geographic data) to calculate a position. For example, the localization module 408 uses data from a GNSS (Global Navigation Satellite System) sensor and geographic data to calculate a longitude and latitude of the AV. In an embodiment, data used by the localization module 408 includes high-precision maps of the roadway geometric properties, maps describing road network connectivity properties, maps describing roadway physical properties (such as traffic speed, traffic volume, the number of vehicular and cyclist traffic lanes, lane width, lane traffic directions, or lane marker types and locations, or combinations of them), and maps describing the spatial locations of road features such as crosswalks, traffic signs or other travel signals of various types.

The control module 406 receives the data representing the trajectory 414 and the data representing the AV position 418 and operates the control functions 420a-c (e.g., steering, throttling, braking, ignition) of the AV in a manner that will cause the AV 100 to travel the trajectory 414 to the destination 412. For example, if the trajectory 414 includes a left turn, the control module 406 will operate the control functions 420a-c in a manner such that the steering angle of the steering function will cause the AV 100 to turn left and the throttling and braking will cause the AV 100 to pause and wait for passing pedestrians or vehicles before the turn is made.

Autonomous Vehicle Inputs

Figure 5:
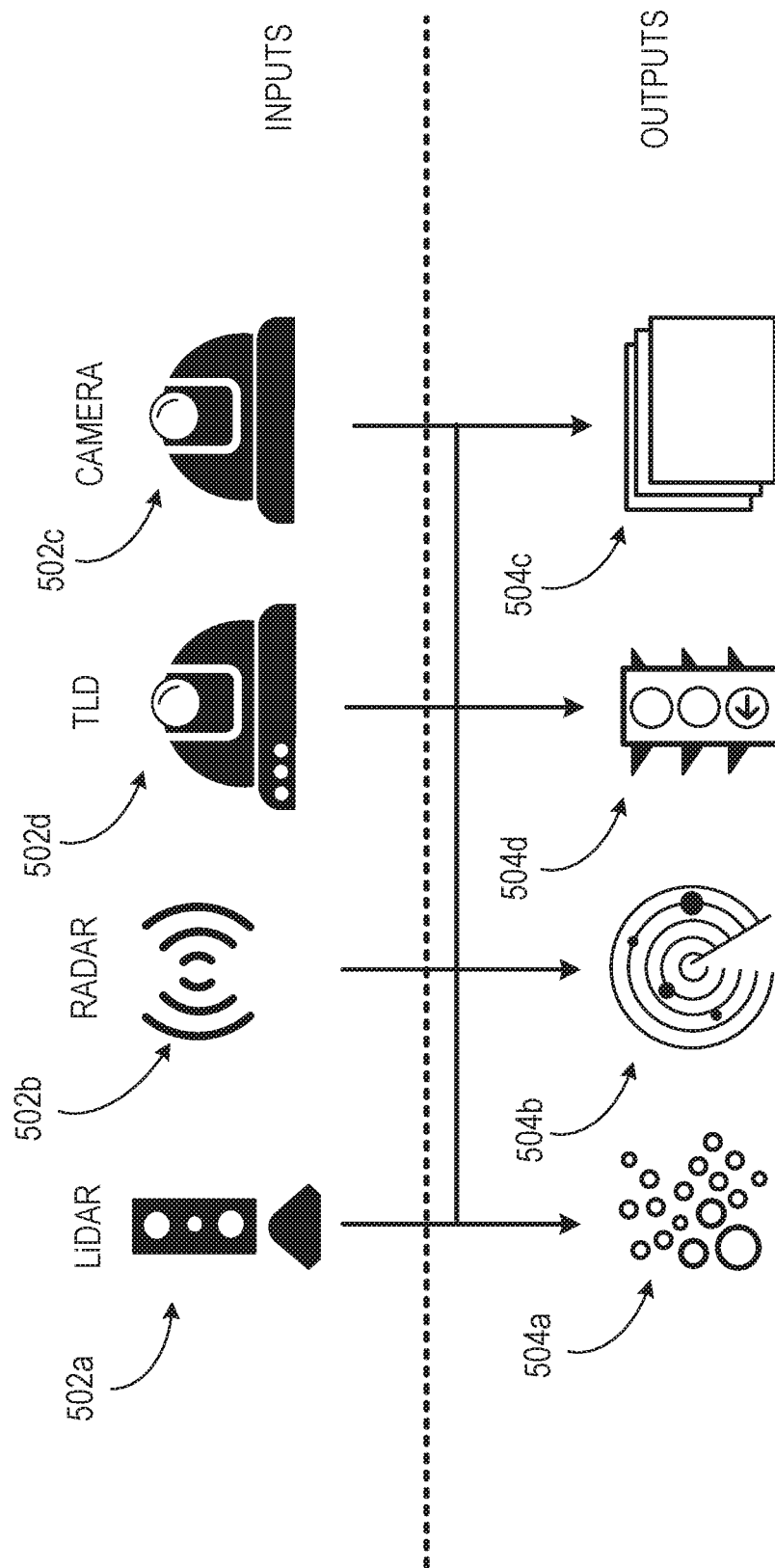
FIG. 5 shows an example of inputs and outputs that may be used by a perception module.

FIG. 5 shows an example of inputs 502a-d (e.g., sensors 121 shown in FIG. 1) and outputs 504a-d (e.g., sensor data) that is used by the perception module 402 (FIG. 4). One input 502a is a LiDAR (Light Detection and Ranging) system (e.g., LiDAR 123 shown in FIG. 1). LiDAR is a technology that uses light (e.g., bursts of light such as infrared light) to obtain data about physical objects in its line of sight. A LiDAR system produces LiDAR data as output 504a. For example, LiDAR data is collections of 3D or 2D points (also known as a point clouds) that are used to construct a representation of the environment 190.

Another input 502b is a RADAR system. RADAR is a technology that uses radio waves to obtain data about nearby physical objects. RADARs can obtain data about objects not within the line of sight of a LiDAR system. A RADAR system 502b produces RADAR data as output 504b. For example, RADAR data are one or more radio frequency electromagnetic signals that are used to construct a representation of the environment 190.

Another input 502c is a camera system. A camera system uses one or more cameras (e.g., digital cameras using a light sensor such as a charge-coupled device [CCD]) to obtain information about nearby physical objects. A camera system produces camera data as output 504c. Camera data often takes the form of image data (e.g., data in an image data format such as RAW, JPEG, PNG, etc.). In some examples, the camera system has multiple independent cameras, e.g., for the purpose of stereopsis (stereo vision), which enables the camera system to perceive depth. Although the objects perceived by the camera system are described here as "nearby," this is relative to the AV. In use, the camera system may be configured to "see" objects far, e.g., up to a kilometer or more ahead of the AV. Accordingly, the camera system may have features such as sensors and lenses that are optimized for perceiving objects that are far away.

Another input 502d is a traffic light detection (TLD) system. A TLD system uses one or more cameras to obtain information about traffic lights, street signs, and other physical objects that provide visual navigation information. A TLD system produces TLD data as output 504d. TLD data often takes the form of image data (e.g., data in an image data format such as RAW, JPEG, PNG, etc.). A TLD system differs from a system incorporating a camera in that a TLD system uses a camera with a wide field of view (e.g., using a wide-angle lens or a fish-eye lens) in order to obtain information about as many physical objects providing visual navigation information as possible, so that the AV 100 has access to all relevant navigation information provided by these objects. For example, the viewing angle of the TLD system may be about 120 degrees or more.

In some embodiments, outputs 504a-d are combined using a sensor fusion technique. Thus, either the individual outputs 504a-d are provided to other systems of the AV 100 (e.g., provided to a planning module 404 as shown in FIG. 4), or the combined output can be provided to the other systems, either in the form of a single combined output or multiple combined outputs of the same type (e.g., using the same combination technique or combining the same outputs or both) or different types type (e.g., using different respective combination techniques or combining different respective outputs or both). In some embodiments, an early fusion technique is used. An early fusion technique is characterized by combining outputs before one or more data processing steps are applied to the combined output. In some embodiments, a late fusion technique is used. A late fusion technique is characterized by combining outputs after one or more data processing steps are applied to the individual outputs.

Figure 6:
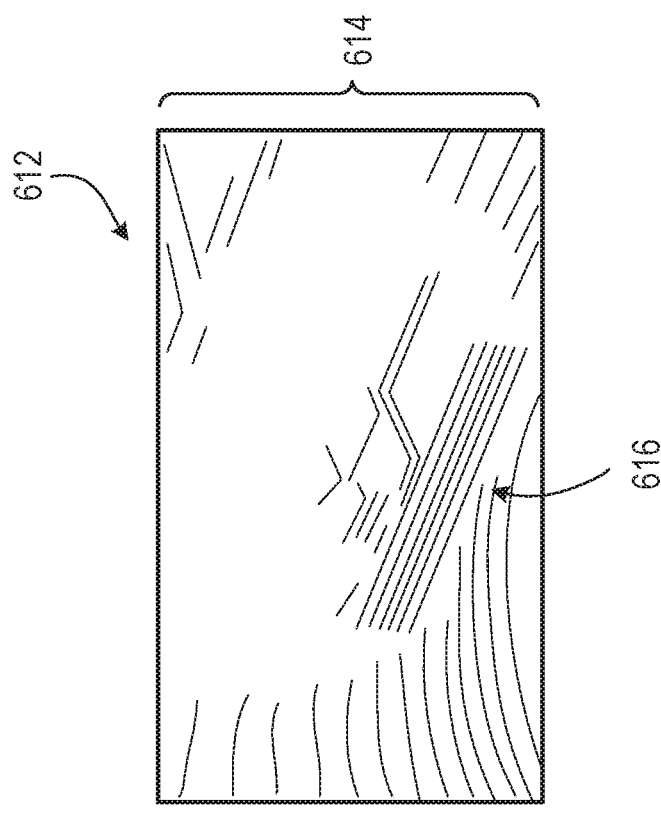
FIG. 6 shows an example of a LiDAR system.

FIG. 6 shows an example of a LiDAR system 602 (e.g., the input 502a shown in FIG. 5). The LiDAR system 602 emits light 604a-c from a light emitter 606 (e.g., a laser transmitter). Light emitted by a LiDAR system is typically not in the visible spectrum; for example, infrared light is often used. Some of the light 604b emitted encounters a physical object 608 (e.g., a vehicle) and reflects back to the LiDAR system 602. (Light emitted from a LiDAR system typically does not penetrate physical objects, e.g., physical objects in solid form.) The LiDAR system 602 also has one or more light detectors 610, which detect the reflected light. In an embodiment, one or more data processing systems associated with the LiDAR system generates an image 612 representing the field of view 614 of the LiDAR system. The image 612 includes information that represents the boundaries 616 of a physical object 608. In this way, the image 612 is used to determine the boundaries 616 of one or more physical objects near an AV.

Figure 7:
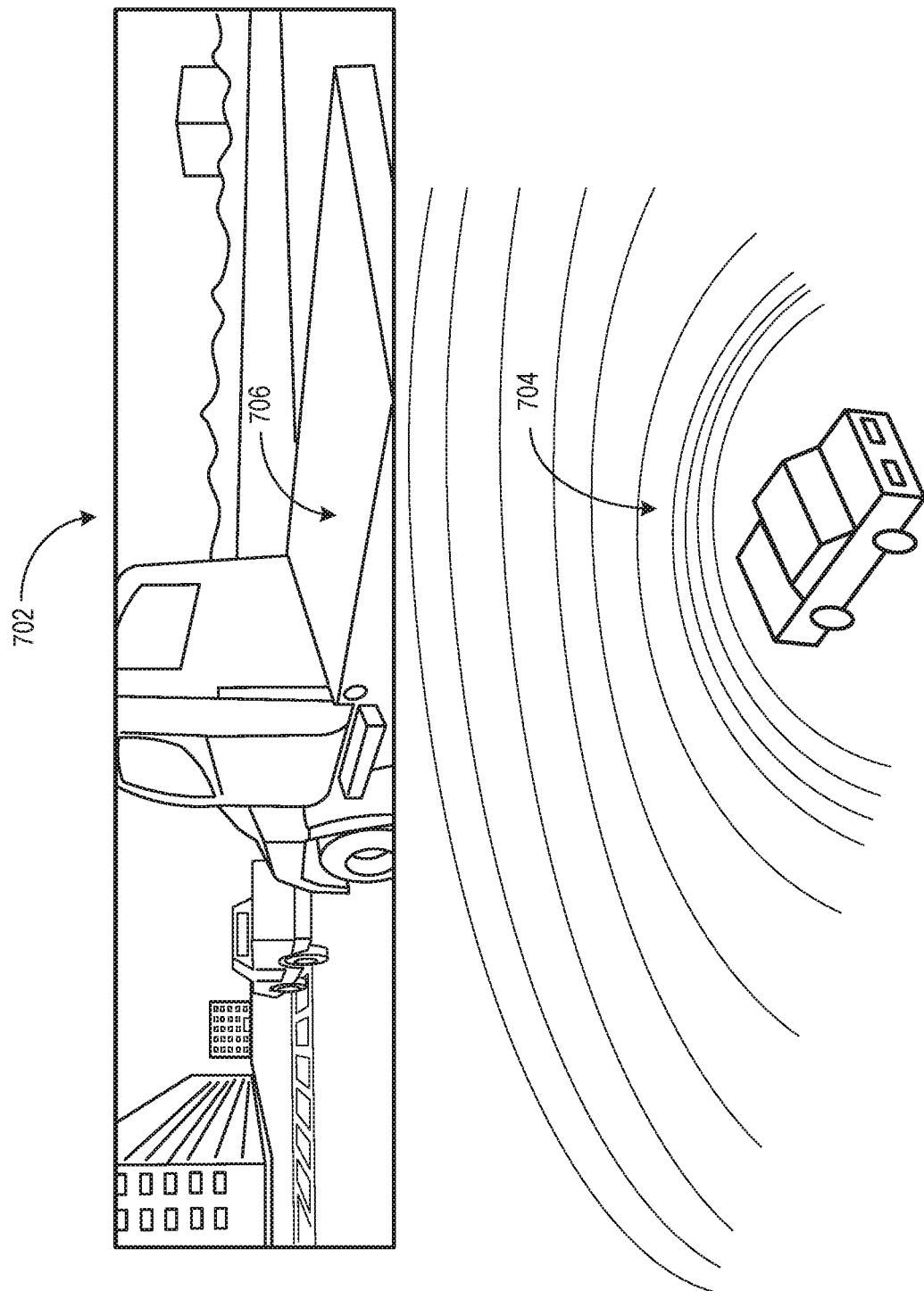
FIG. 7 shows the LiDAR system in operation.

FIG. 7 shows the LiDAR system 602 in operation. In the scenario shown in this figure, the AV 100 receives both camera system output 504c in the form of an image 702 and LiDAR system output 504a in the form of LiDAR data points 704. In use, the data processing systems of the AV 100 compares the image 702 to the data points 704. In particular, a physical object 706 identified in the image 702 is also identified among the data points 704. In this way, the AV 100 perceives the boundaries of the physical object based on the contour and density of the data points 704.

Figure 8:
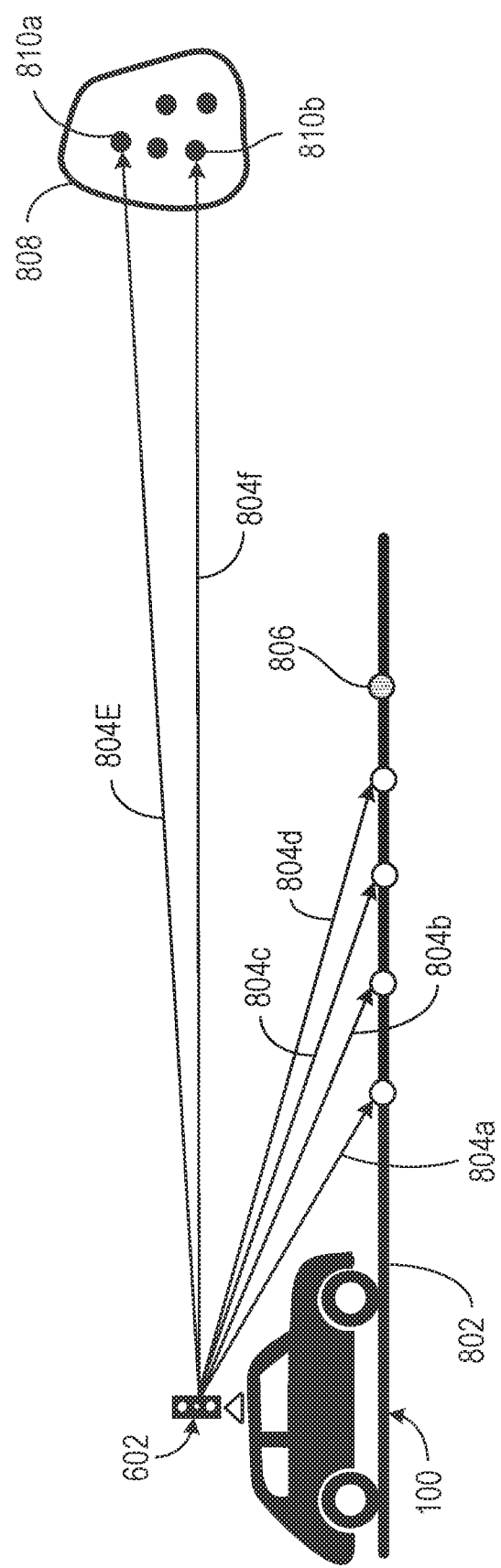
FIG. 8 shows the operation of the LiDAR system in additional detail.

FIG. 8 shows the operation of the LiDAR system 602 in additional detail. As described above, the AV 100 detects the boundary of a physical object based on characteristics of the data points detected by the LiDAR system 602. As shown in FIG. 8, a flat object, such as the ground 802, will reflect light 804a-d emitted from a LiDAR system 602 in a consistent manner. Put another way, because the LiDAR system 602 emits light using consistent spacing, the ground 802 will reflect light back to the LiDAR system 602 with the same consistent spacing. As the AV 100 travels over the ground 802, the LiDAR system 602 will continue to detect light reflected by the next valid ground point 806 if nothing is obstructing the road. However, if an object 808 obstructs the road, light 804e-f emitted by the LiDAR system 602 will be reflected from points 810a-b in a manner inconsistent with the expected consistent manner. From this information, the AV 100 can determine that the object 808 is present.

Path Planning

Figure 9:
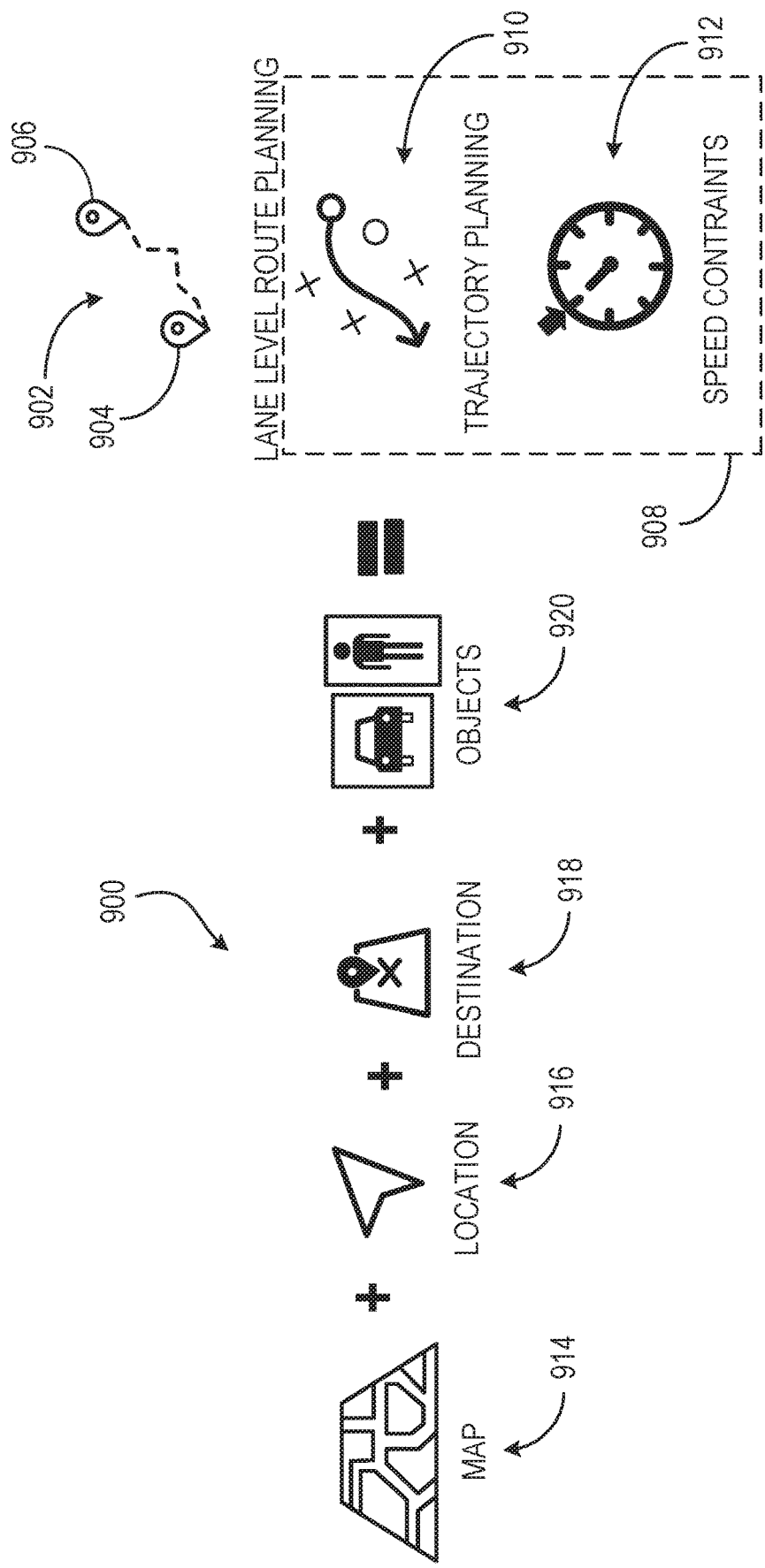
FIG. 9 shows a block diagram of the relationships between inputs and outputs of a planning module.

FIG. 9 shows a block diagram 900 of the relationships between inputs and outputs of a planning module 404 (e.g., as shown in FIG. 4). In general, the output of a planning module 404 is a route 902 from a start point 904 (e.g., source location or initial location), and an end point 906 (e.g., destination or final location). The route 902 is typically defined by one or more segments. For example, a segment is a distance to be traveled over at least a portion of a street, road, highway, driveway, or other physical area appropriate for automobile travel. In some examples, e.g., if the AV 100 is an off-road capable vehicle such as a four-wheel-drive (4WD) or all-wheel-drive (AWD) car, SUV, pick-up truck, or the like, the route 902 includes "off-road" segments such as unpaved paths or open fields.

In addition to the route 902, a planning module also outputs lane-level route planning data 908. The lane-level route planning data 908 is used to traverse segments of the route 902 based on conditions of the segment at a particular time. For example, if the route 902 includes a multi-lane highway, the lane-level route planning data 908 includes trajectory planning data 910 that the AV 100 can use to choose a lane among the multiple lanes, e.g., based on whether an exit is approaching, whether one or more of the lanes have other vehicles, or other factors that vary over the course of a few minutes or less. Similarly, in some implementations, the lane-level route planning data 908 includes speed constraints 912 specific to a segment of the route 902. For example, if the segment includes pedestrians or unexpected traffic, the speed constraints 912 may limit the AV 100 to a travel speed slower than an expected speed, e.g., a speed based on speed limit data for the segment.

In an embodiment, the inputs to the planning module 404 includes database data 914 (e.g., from the database module 410 shown in FIG. 4), current location data 916 (e.g., the AV position 418 shown in FIG. 4), destination data 918 (e.g., for the destination 412 shown in FIG. 4), and object data 920 (e.g., the classified objects 416 as perceived by the perception module 402 as shown in FIG. 4). In some embodiments, the database data 914 includes rules used in planning. Rules are specified using a formal language, e.g., using Boolean logic. In any given situation encountered by the AV 100, at least some of the rules will apply to the situation. A rule applies to a given situation if the rule has conditions that are met based on information available to the AV 100, e.g., information about the surrounding environment. Rules can have priority. For example, a rule that says, "if the road is a freeway, move to the leftmost lane" can have a lower priority than "if the exit is approaching within a mile, move to the rightmost lane."

Figure 10:
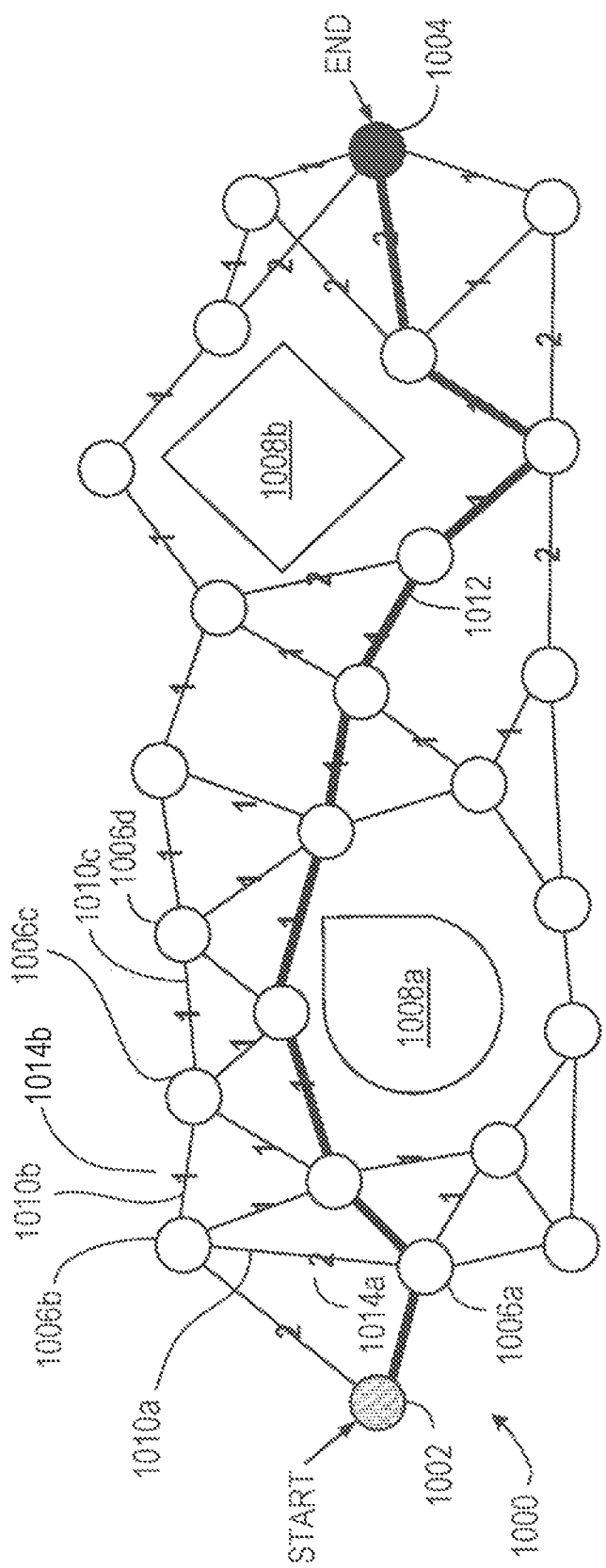
FIG. 10 shows a directed graph used in path planning.

FIG. 10 shows a directed graph 1000 used in path planning, e.g., by the planning module 404 (FIG. 4). In general, a directed graph 1000 like the one shown in FIG. 10 is used to determine a path between any start point 1002 and end point 1004. In real-world terms, the distance separating the start point 1002 and end point 1004 may be relatively large (e.g, in two different metropolitan areas) or may be relatively small (e.g., two intersections abutting a city block or two lanes of a multi-lane road).

In an embodiment, the directed graph 1000 has nodes 1006a-d representing different locations between the start point 1002 and the end point 1004 that could be occupied by an AV 100. In some examples, e.g., when the start point 1002 and end point 1004 represent different metropolitan areas, the nodes 1006a-d represent segments of roads. In some examples, e.g., when the start point 1002 and the end point 1004 represent different locations on the same road, the nodes 1006a-d represent different positions on that road. In this way, the directed graph 1000 includes information at varying levels of granularity. In an embodiment, a directed graph having high granularity is also a subgraph of another directed graph having a larger scale. For example, a directed graph in which the start point 1002 and the end point 1004 are far away (e.g., many miles apart) has most of its information at a low granularity and is based on stored data, but also includes some high granularity information for the portion of the graph that represents physical locations in the field of view of the AV 100.

The nodes 1006a-d are distinct from objects 1008a-b which cannot overlap with a node. In an embodiment, when granularity is low, the objects 1008a-b represent regions that cannot be traversed by automobile, e.g., areas that have no streets or roads. When granularity is high, the objects 1008a-b represent physical objects in the field of view of the AV 100, e.g., other automobiles, pedestrians, or other entities with which the AV 100 cannot share physical space. In an embodiment, some or all of the objects 1008a-b are a static objects (e.g., an object that does not change position such as a street lamp or utility pole) or dynamic objects (e.g., an object that is capable of changing position such as a pedestrian or other car).

The nodes 1006a-d are connected by edges 1010a-c. If two nodes 1006a-b are connected by an edge 1010a, it is possible for an AV 100 to travel between one node 1006a and the other node 1006b, e.g., without having to travel to an intermediate node before arriving at the other node 1006b. (When we refer to an AV 100 traveling between nodes, we mean that the AV 100 travels between the two physical positions represented by the respective nodes.) The edges 1010a-c are often bidirectional, in the sense that an AV 100 travels from a first node to a second node, or from the second node to the first node. In an embodiment, edges 1010a-c are unidirectional, in the sense that an AV 100 can travel from a first node to a second node, however the AV 100 cannot travel from the second node to the first node. Edges 1010a-c are unidirectional when they represent, for example, one-way streets, individual lanes of a street, road, or highway, or other features that can only be traversed in one direction due to legal or physical constraints.

In an embodiment, the planning module 404 uses the directed graph 1000 to identify a path 1012 made up of nodes and edges between the start point 1002 and end point 1004.

An edge 1010a-c has an associated cost 1014a-b. The cost 1014a-b is a value that represents the resources that will be expended if the AV 100 chooses that edge. A typical resource is time. For example, if one edge 1010a represents a physical distance that is twice that as another edge 1010b, then the associated cost 1014a of the first edge 1010a may be twice the associated cost 1014b of the second edge 1010b. Other factors that affect time include expected traffic, number of intersections, speed limit, etc. Another typical resource is fuel economy. Two edges 1010a-b may represent the same physical distance, but one edge 1010a may require more fuel than another edge 1010b, e.g., because of road conditions, expected weather, etc.

When the planning module 404 identifies a path 1012 between the start point 1002 and end point 1004, the planning module 404 typically chooses a path optimized for cost, e.g., the path that has the least total cost when the individual costs of the edges are added together.

Autonomous Vehicle Control

Figure 11:
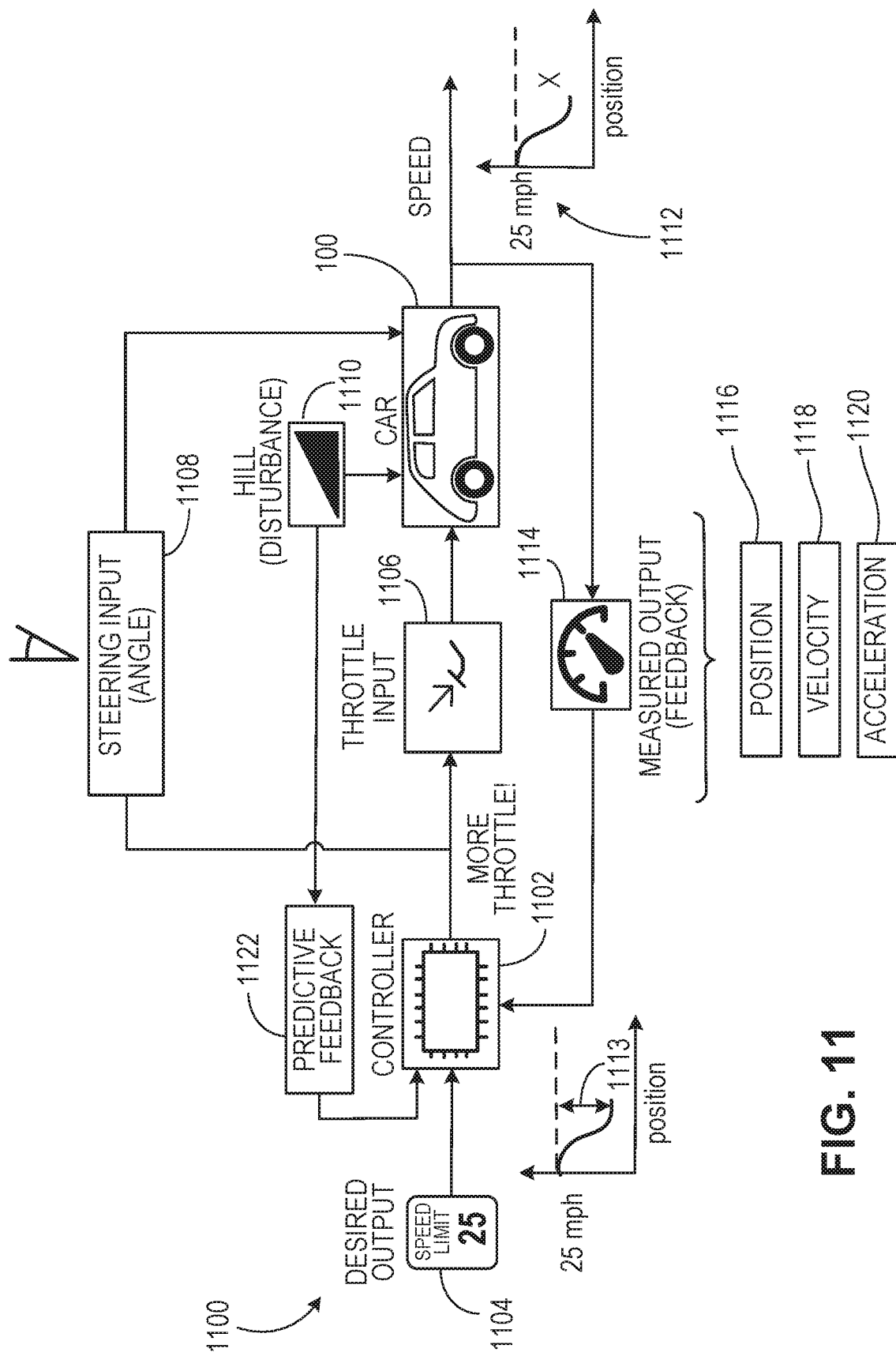
FIG. 11 shows a block diagram of the inputs and outputs of a control module.

FIG. 11 shows a block diagram 1100 of the inputs and outputs of a control module 406 (e.g., as shown in FIG. 4). A control module operates in accordance with a controller 1102 which includes, for example, one or more processors (e.g., one or more computer processors such as microprocessors or microcontrollers or both) similar to processor 304, short-term and/or long-term data storage (e.g., memory random-access memory or flash memory or both) similar to main memory 306, ROM 308, and storage device 210, and instructions stored in memory that carry out operations of the controller 1102 when the instructions are executed (e.g., by the one or more processors).

In an embodiment, the controller 1102 receives data representing a desired output 1104. The desired output 1104 typically includes a velocity, e.g., a speed and a heading. The desired output 1104 can be based on, for example, data received from a planning module 404 (e.g., as shown in FIG. 4). In accordance with the desired output 1104, the controller 1102 produces data usable as a throttle input 1106 and a steering input 1108. The throttle input 1106 represents the magnitude in which to engage the throttle (e.g., acceleration control) of an AV 100, e.g., by engaging the steering pedal, or engaging another throttle control, to achieve the desired output 1104. In some examples, the throttle input 1106 also includes data usable to engage the brake (e.g., deceleration control) of the AV 100. The steering input 1108 represents a steering angle, e.g., the angle at which the steering control (e.g., steering wheel, steering angle actuator, or other functionality for controlling steering angle) of the AV should be positioned to achieve the desired output 1104.

In an embodiment, the controller 1102 receives feedback that is used in adjusting the inputs provided to the throttle and steering. For example, if the AV 100 encounters a disturbance 1110, such as a hill, the measured speed 1112 of the AV 100 is lowered below the desired output speed. In an embodiment, any measured output 1114 is provided to the controller 1102 so that the necessary adjustments are performed, e.g., based on the differential 1113 between the measured speed and desired output. The measured output 1114 includes measured position 1116, measured velocity 1118, (including speed and heading), measured acceleration 1120, and other outputs measurable by sensors of the AV 100.

In an embodiment, information about the disturbance 1110 is detected in advance, e.g., by a sensor such as a camera or LiDAR sensor, and provided to a predictive feedback module 1122. The predictive feedback module 1122 then provides information to the controller 1102 that the controller 1102 can use to adjust accordingly. For example, if the sensors of the AV 100 detect ("see") a hill, this information can be used by the controller 1102 to prepare to engage the throttle at the appropriate time to avoid significant deceleration.

Figure 12:
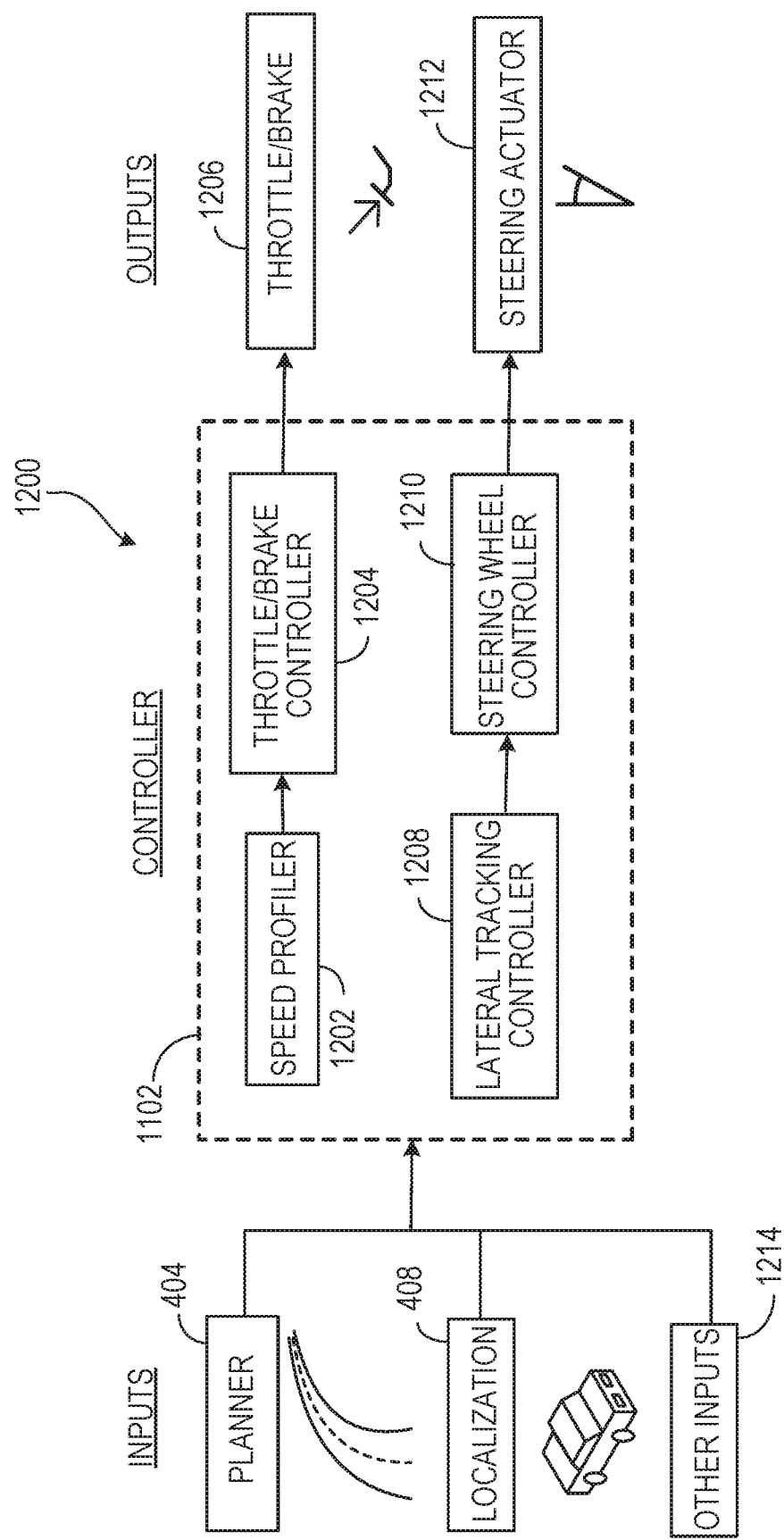
FIG. 12 shows a block diagram of the inputs, outputs, and components of a controller.

FIG. 12 shows a block diagram 1200 of the inputs, outputs, and components of the controller 1102. The controller 1102 has a speed profiler 1202 which affects the operation of a throttle/brake controller 1204. For example, the speed profiler 1202 instructs the throttle/brake controller 1204 to engage acceleration or engage deceleration using the throttle/brake 1206 depending on, e.g., feedback received by the controller 1102 and processed by the speed profiler 1202.

The controller 1102 also has a lateral tracking controller 1208 which affects the operation of a steering controller 1210. For example, the lateral tracking controller 1208 instructs the steering controller 1210 to adjust the position of the steering angle actuator 1212 depending on, e.g., feedback received by the controller 1102 and processed by the lateral tracking controller 1208.

The controller 1102 receives several inputs used to determine how to control the throttle/brake 1206 and steering angle actuator 1212. A planning module 404 provides information used by the controller 1102, for example, to choose a heading when the AV 100 begins operation and to determine which road segment to traverse when the AV 100 reaches an intersection. A localization module 408 provides information to the controller 1102 describing the current location of the AV 100, for example, so that the controller 1102 can determine if the AV 100 is at a location expected based on the manner in which the throttle/brake 1206 and steering angle actuator 1212 are being controlled. In an embodiment, the controller 1102 receives information from other inputs 1214, e.g., information received from databases, computer networks, etc.

Using Blockchain Technology to Maintain and Validate Vehicle Ledgers

Figure 13:
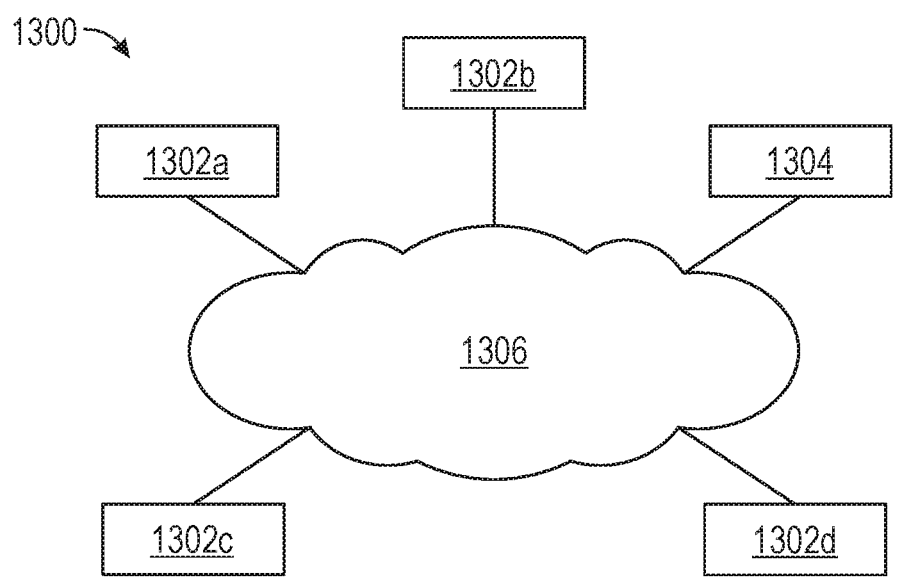
FIG. 13 illustrates an example of a distributed network architecture.

FIG. 13 shows an example distributed network architecture 1300 that is similar to cloud computing environment 200. Distributed network architecture 1300 is a system or network that includes vehicle nodes 1302a-1302d and master node 1304, which are interconnected via cloud 1306. Each vehicle node 1302 represents an electronic device (e.g., similar to computer system 300) that is associated with an AV (e.g., AV 100). For example, a vehicle node can represent a service provider (e.g., a dealership, an automotive technician, an authorized automotive repair facility) operating within distributed network architecture 1300. As another example, a vehicle node can represent an AV that is connected to distributed network architecture 1300. Master node 1304 represents an electronic device (e.g., similar to computer system 300) that is used for managing a master ledger, which contains copies of records for vehicles associated with distributed network architecture 1300. As discussed in greater detail below, the master ledger is based on a privately distributed blockchain and can be updated by master node 1304 to include data from vehicle ledgers to ensure the master ledger is accurate and current.

Each vehicle ledger includes data for a particular AV operating in connection with distributed network architecture 1300. For example, FIGS. 14a and 14b illustrate two versions of vehicle ledger 1400, which is an example of a vehicle ledger that is associated with a vehicle with identification number 41. FIG. 14a shows a first version of the vehicle ledger and, therefore, uses reference number 1400-1 to reference the first version of the vehicle ledger. FIG. 14b shows a second version of the vehicle ledger (e.g., an updated version of the vehicle ledger) and, therefore, uses reference number 1400-2 to reference the second version of the vehicle ledger. In the embodiments disclosed herein, reference number 1400 is used to reference the vehicle ledger in FIG. 14a or 14b indiscriminately, whereas reference number 1400-1 is used to specifically reference the first version of the vehicle ledger shown in FIG. 14a and reference number 1400-2 is used to specifically reference the second version of the vehicle ledger shown in FIG. 14b.

In the embodiments illustrated in FIGS. 14a and 14b, vehicle ledger 1400 is shown having various data fields, including vehicle identifier 1402, component 1404, revision level 1406, user 1408, born on date 1410, service date 1412, activity 1414, and block 1416. Each row of data in vehicle ledger 1400 contains entries for one or more of the respective data fields. For example, row 1421 contains entries that indicate that component "Comp 1" was installed (as indicated by "Add" in entry 1414a) in vehicle 41 by user "xbbch2." As indicated by the born on date, the component was created or installed on Sep. 1, 2018. Entry 1416a indicates that the data in row 1421 is recorded in block 101 of the blockchain, as discussed in greater detail below. The fields listed above, and shown in FIGS. 14a and 14b, provide non-limiting examples of the data fields that can be contained in a vehicle ledger. Various ones of the listed data fields can be omitted, and different data fields can be included, as appropriate.

Collectively, the data contained in the data fields of vehicle ledger 1400 provide information that can be used to track and record changes made in a respective AV. For example, first version of vehicle ledger 1400-1 shows a first version of a vehicle ledger, and second version of vehicle ledger 1400-2 shows a second version of the vehicle ledger that is updated to contain the data in row 1422. In some embodiments, a vehicle ledger can be updated when an authorized user (e.g., an authorized person or service facility associated with a respective one of vehicle nodes 1302a-1302d) updates software, performs a service check, removes a vehicle component, replaces a vehicle component, or performs some other authorized service on the AV. As discussed in detail below, the updates provided in new row 1422 can be evaluated by master node 1304 for potentially updating the master ledger.

In the embodiments described herein, the master ledger is maintained by master node 1304 using a privately distributed blockchain. Specifically, each block in the blockchain comprises a copy of the prior block in the vehicle ledger for a particular vehicle (e.g., vehicle ledger 1400). When a vehicle ledger is updated (for example, as shown in vehicle ledger 1400-2), master node 1304 verifies the update and, if master node 1304 determines the update to be valid, updates the master ledger by adding the new block to the blockchain. Master node 1304 then distributes a copy of the updated blockchain to vehicle nodes 1302a-1302d. In some embodiments, an AV receives a copy of the master ledger every time it connects to distributed network architecture 1300 (e.g., via a respective one of vehicle nodes 1302a-1302d). In some embodiments, vehicle nodes 1302a-1302d are not permitted to update the master ledger. Because the master ledger is implemented using this privately distributed blockchain, the master ledger is immutable (e.g., the master ledger cannot be changed), thereby providing a secure and redundant system for maintaining vehicle ledgers that, due to the inherent security capabilities of blockchain, cannot be easily changed and is less susceptible to hacking. It should be appreciated that, in some embodiments, the immutability of the master ledger is enforced both mathematically and due to the distributed nature of the blockchain network. For example, in order to modify the master ledger, a malicious actor would have to overtake more than 50% of the nodes in the blockchain network.

FIGS. 15a and 15b illustrate two versions of master ledger 1500. FIG. 15a shows a first version of the master ledger and, therefore, uses reference number 1500-1 to reference the first version of the master ledger. FIG. 15b shows a second version of the master ledger (e.g., an updated version of the master ledger) and, therefore, uses reference number 1500-2 to reference the second version of the master ledger. In the embodiments disclosed herein, reference number 1500 is used to reference the master ledger in FIG. 15a or 15b indiscriminately, whereas reference number 1500-1 is used to specifically reference the first version of the master ledger shown in FIG. 15a and reference number 1500-2 is used to specifically reference the second version of the master ledger shown in FIG. 15b.

Master ledger 1500 is a collection of data collected from all vehicle ledgers and their approved updates and, therefore, includes the same data fields as those shown in vehicle ledger 1400. For the sake of simplicity, master ledger 1500 is shown with the same data of vehicle ledger 1400, but also includes rows 1502 corresponding to data collected from vehicle ledgers associated with other vehicles associated with distributed network architecture 1300.

First version of master ledger 1500-1 is a version of the master ledger that corresponds to the first version of vehicle ledger 1400-1. In other words, master ledger 1500-1 is the current version of the master ledger prior to master node 1304 validating the changes provided in row 1422 of vehicle ledger 1400-2. Second version of master ledger 1500-2 is an updated version of the master ledger after master node 1304 validates the changes of the second version of vehicle ledger 1400-2, in accordance with the following disclosure. Accordingly, master ledger 1500-2 includes new row 1510, which corresponds to the data in row 1422 of vehicle ledger 1400-2. As shown in FIG. 15b, the data in row 1510 is added to the blockchain as block 153, as shown by entry 1512.

In some embodiments, updated vehicle data is added to the master ledger by master node 1304, when master node 1304 receives a request to update the master ledger. This request can be initiated by a respective one of vehicle nodes 1302a-1302d. For example, an AV that comes in for servicing is connected to distributed network architecture 1300 at vehicle node 1302a. Service is performed on the AV, and the vehicle ledger associated with the AV is updated to reflect the service performed on the AV. For example, vehicle ledger 1400-2 shows the vehicle ledger is updated with row 1422 to indicate Comp 51 was installed on vehicle 41. Vehicle node 1302a then initiates a request for master node 1304 to update the master ledger with the updated vehicle ledger (e.g., by adding the data in row 1422 to master ledger 1500). In some embodiments, as a part of this request, vehicle node 1302a sends a copy of the changed vehicle ledger (e.g., vehicle ledger 1400-2) to master node 1304 for evaluation. If master node 1304 approves the changes to the vehicle ledger, master node 1304 updates the master ledger with the updated vehicle ledger, as shown in master ledger 1500-2 in FIG. 15*b*, and sends vehicle node 1302*a* (and vehicle nodes 1302*b*-1302*d*) an updated copy of the master ledger (e.g., master ledger 1500-2), which includes the updated vehicle ledger data. In some embodiments, vehicle node 1302*a* then stores the updated copy of the master ledger and included data from the vehicle ledger at the AV as the new block in the blockchain (e.g., block 153). In some embodiments, the AV receives an updated copy of the vehicle ledger (as a copy of the full master ledger) each time it connects to distributed network architecture 1300.

As mentioned above, master node 1304 verifies whether an update to a vehicle ledger is valid. This can be performed in accordance with various system requirements that provide an enhanced layer of security to ensure that changes to a vehicle ledger are authorized. For example, in some embodiments, the vehicle ledger is checked for changes at various instances such as, for example, upon startup, when being brought in for service at an authorized service shop, or at predetermined intervals (e.g., every second). As another example, in some embodiments, changes to a vehicle ledger are only considered valid if they occur when the AV is connected to distributed network architecture 1300, such as, for example, by being in communication with master node 1304 (e.g., when the AV is associated with a respective one of vehicle nodes 1302*a*-1302*d*) or by being serviced at an authorized shop associated with a respective one of vehicle nodes 1302*a*-1302*d*.

In some embodiments, an additional layer of security is provided by maintaining multiple copies of the vehicle ledger at the AV. In such embodiments, the local copies of the vehicle ledger are stored at different locations in the AV to protect against unauthorized changes (e.g., via a hack) by providing a redundancy that can only be overcome by changing a majority of the stored copies of the vehicle ledger. This guards against an attack in which a hacker attempts to change the vehicle ledger, because the hacker has to locate and change a majority of the stored copies of the vehicle ledger in order to potentially have the changes approved by master node 1304. In some embodiments, when validating an updated vehicle ledger, master node 1304 checks all copies of the blockchain stored at the AV. If less than half of the vehicle ledgers have changes that are not present in the most recent version of the vehicle ledger pushed to the AV (e.g., less than half of the vehicle ledgers are updated), master node 1304 rejects the changed vehicle ledgers as invalid and does not update the master ledger with the changes. In some embodiments, if more than half of the vehicle ledgers, but less than all, have changes that are not present in the most recent version of the vehicle ledger pushed to the AV (e.g., more than half of the vehicle ledgers, but not all, are updated), master node 1304 flags the changes for further evaluation without immediately updating the master ledger with the changes. In some embodiments, if all copies of the vehicle ledger have changes that are not present in the most recent version of the vehicle ledger pushed to the AV (e.g., all copies of the vehicle ledger are identically updated), master node 1304 considers the changes to be valid and, if all other security considerations are satisfied, updates the master ledger with the changes.

In some embodiments, changes to the vehicle ledger are rejected (or determined to be unauthorized) if the changes are received from a source other than master node 1304. In other words, if the changes are not recorded in the master ledger, the changes are not authorized. Such unauthorized changes can be discarded, for example, by overwriting the unauthorized version of the vehicle ledger with a current copy of the master ledger. For example, if master node 1304 determined the changes in row 1422 of vehicle ledger 1400-2 to be invalid or unauthorized, vehicle ledger 1400-2 would be overwritten by a current copy of the master ledger, which, in this instance, would be master ledger 1500-1.

Various embodiments of distributed network architecture 1300, and methods for using a blockchain architecture to maintain and validate vehicle ledgers, are described in additional detail below with respect to the flow diagram shown in FIG. 16. It should be appreciated that the embodiments discussed above can apply to the description provided below, and vice versa. Thus, the following description provides various embodiments of a method for using blockchain technology to maintain a vehicle ledger in accordance with the architecture discussed above.

Figure 16:
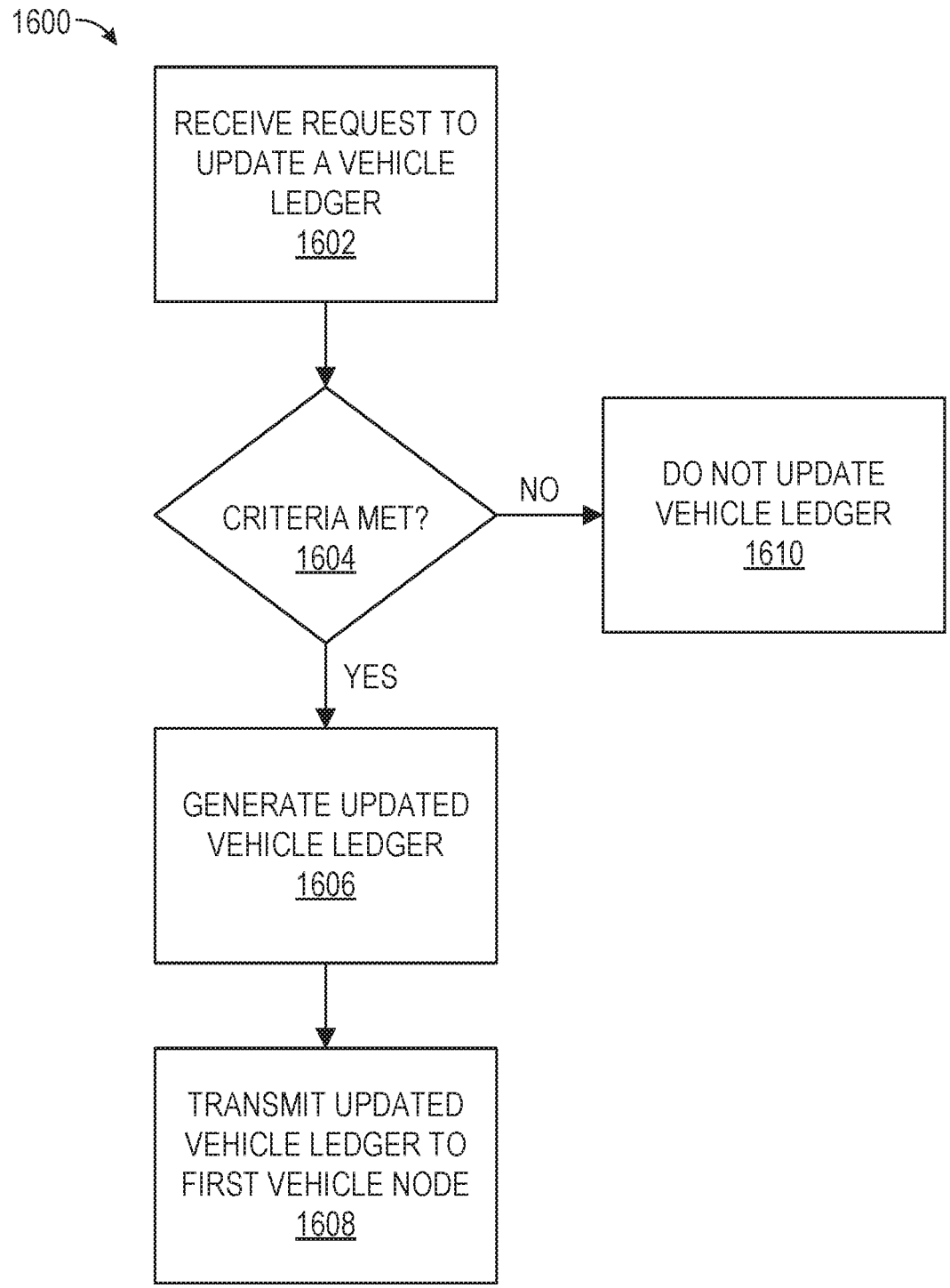
FIG. 16 is a flow chart of an example process for using blockchain to maintain and validate a vehicle ledger.

Example Process for Using Blockchain Technology to Maintain and Validate a Vehicle Ledger FIG. 16 is a flow chart of an example process 1600 for maintaining vehicle ledgers (e.g., vehicle ledger 1400) in a distributed network architecture (e.g., 1300) (e.g., a network for managing and maintaining vehicle records). Vehicle ledgers can include data that corresponds to a particular vehicle. Vehicle ledgers can include copies of a blockchain. For convenience, the process 1600 will be described as being performed by a system of one or more computers located in one or more locations. For example, distributed network architecture 1300 of FIG. 13, appropriately programmed in accordance with this specification, can perform the process 1600.

At item 1602, the system (e.g., 1300) receives, at a master node (e.g., 1304) in the distributed network architecture (e.g., 1300) (e.g., a node (e.g., processor) in the architecture that has authority to manage and maintain a blockchain containing vehicle records for vehicles associated with the network), a request to update a vehicle ledger (e.g., vehicle ledger 1400) (e.g., a copy of the blockchain that contains vehicle records for a particular vehicle) associated with a first vehicle node (e.g., 1302*a*) (e.g., a node in the architecture that corresponds to a particular vehicle) of a plurality of vehicle nodes (e.g., 1302*a*-1302*d*) comprising the distributed network architecture.

In some embodiments, as a part of receiving the request, the system receives a first version of the vehicle ledger (e.g., vehicle ledger 1400-2) stored at the first vehicle (e.g., AV 100) associated with the first vehicle node (e.g., 1302*a*), the first version of the vehicle ledger including one or more changes (e.g., see row 1422 in FIG. 14*b*) to the vehicle data for the first vehicle that is not stored in the master ledger (e.g., master ledger 1500-1 does not include the data of row 1422 unless/until it has been authorized).

In some embodiments, a plurality of copies of the vehicle ledger are stored at the first vehicle (e.g., AV 100). In some embodiments, in accordance with a determination that a majority of the copies of the vehicle ledger stored at the first vehicle include the one or more changes to the vehicle data for the first vehicle, the system initiates a process for evaluating the one or more changes to the vehicle data for the first vehicle. In some embodiments, the master ledger (e.g., 1500) is updated with the changes to the vehicle data for the first vehicle only if the first version of the vehicle ledger (e.g., vehicle ledger 1400-2) represents (e.g., is consistent with) a majority of the copies of the vehicle ledger stored at the first vehicle.

In some embodiments, the vehicle ledger (e.g., 1400) includes vehicle data for the first vehicle that includes one or more items selected from the group consisting of: vehicle components, software for a respective vehicle component, and a revision level for the respective vehicle component.

In some embodiments, the request is sent from the first vehicle node (e.g., 1302*a*) in response to a detection of a predetermined event (e.g., the first vehicle node sends the request in response to detecting the predetermined event). In some embodiments, the predetermined event is vehicle startup (e.g., the first vehicle node detects vehicle startup when the first vehicle is in communication with the first vehicle node). In some embodiments, the predetermined event is expiration of a predetermined amount of time (e.g., a non-zero amount of time such as, for example, about one second). In some embodiments, the predetermined event is establishing a communication session between the first vehicle node and the first vehicle (e.g., the first vehicle and first vehicle node establish a communication session when the vehicle is brought in for servicing by a party associated with the distributed network architecture).

At item 1604, the system (e.g., 1300) determines whether first criteria are met (e.g., criteria that is required to be met in order to permit updating the vehicle ledger with information via the master node). If the first criteria are met, the system updates the vehicle ledger as provided in items 1606 and 1608. If the first criteria are not met, the system forgoes updating the vehicle ledger as provided in item 1610. In some embodiments, the first criteria are satisfied when all changes in the vehicle ledger are valid and all security considerations are satisfied. Examples of such criteria and considerations are provided in the various embodiments described herein.

At item 1606, the system generates an updated version of the vehicle ledger (e.g., 1400) using vehicle data stored in a master ledger (e.g., 1500) that is associated with the master node (e.g., 1304). The vehicle data corresponds to a first vehicle (e.g., AV 100) associated with the first vehicle node (e.g., 1302*a*). The master ledger is implemented using a blockchain that contains vehicle records (e.g., blocks in the blockchain, each block containing a set of vehicle records for a respective vehicle associated with the distributed network architecture) for a plurality of vehicles associated with the distributed network architecture (e.g., 1300). For example, the master ledger is a collection of vehicle data that corresponds to all vehicle nodes comprising the network. For example, the master ledger is a blockchain architecture that contains vehicle records that make up blocks in the blockchain and are used for verifying and updating all vehicle ledgers, which are copies of the blockchain. The blockchain includes a first block including the vehicle data corresponding to the first vehicle.

At item 1608, the system transmits the updated version of the vehicle ledger to the first vehicle node (e.g., 1302*a*) (e.g., a node (e.g., processor) in the architecture that corresponds to the first vehicle and facilitates communication between the first vehicle and the distributed network 1300).

In some embodiments, the master ledger (e.g., 1500) includes a first copy of the blockchain (e.g., the master ledger is a first copy of the blockchain). In some embodiments, the vehicle ledger (e.g., 1400) includes a second copy of the blockchain (e.g., a copy of the blockchain that is received from the master ledger 1500) (e.g., the vehicle ledger is a second copy of the blockchain). In some embodiments, the first criteria are met when the first copy of the blockchain and the second copy of the blockchain are not identical.

In some embodiments, as a part of generating the updated version of the vehicle ledger using vehicle data stored in the master ledger, the system adds vehicle data to the blockchain (e.g., the system generates a new block in the blockchain using vehicle data for the first vehicle). In some embodiments, receiving the request to update the vehicle ledger for the first vehicle includes receiving a copy of the current vehicle ledger stored at the first vehicle (e.g., 1400-2) (e.g., the blockchain stored at the first vehicle prior to receiving the updated copy of the blockchain from the master node). When the copy of the current vehicle ledger (e.g., from the first vehicle) contains valid, updated data for the first vehicle (e.g., data in row 1422 of vehicle ledger 1400-2) (e.g., data not contained in the master ledger 1500-1), the master ledger is updated with the new data and the master ledger adds the new data for the first vehicle to the blockchain as a new block in the blockchain. For example, in FIG. 15*b*, master ledger 1500-2 is updated with the data in row 1510, which is added to the blockchain as new block 153. In some embodiments, the first criteria are met when the copy of the current vehicle ledger contains valid, updated data for the first vehicle.

In some embodiments, in accordance with a determination that second criteria are met, the system updates the master ledger (e.g., 1500-2) to include the one or more changes (e.g., see row 1510) to the vehicle data for the first vehicle. In some embodiments, in accordance with a determination that the second criteria are not met, the system forgoes updating the master ledger to include the one or more changes to the vehicle data for the first vehicle (e.g., discarding the changes). In some embodiments, the second criteria are not met when the one or more changes to the vehicle data were made when the first vehicle was not in communication with the master node (e.g., 1304) (e.g., directly or indirectly via the distributed network architecture 1300). In some embodiments, the second criteria are met when the one or more changes are received from the master node (e.g., changes in the master ledger are communicated from the master node). In some embodiments, as a part of forgoing updating the master ledger to include the one or more changes to the vehicle data for the first vehicle, the system replaces the first version of the vehicle ledger with the updated vehicle ledger (e.g., a copy of the updated master ledger 1500-2).

In some embodiments, the first criteria are met when the second criteria are met.

In some embodiments, the master ledger is remote from the first vehicle.

In some embodiments, the process further includes maintaining (e.g., updating) the master ledger (e.g., 1500) using the blockchain that contains vehicle records for the plurality of vehicles associated with the distributed network architecture (e.g., 1300).

In the foregoing description, embodiments of the invention have been described with reference to numerous specific details that may vary from implementation to implementation. The description and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction. Any definitions expressly set forth herein for terms contained in such claims shall govern the meaning of such terms as used in the claims. In addition, when we use the term "further comprising," in the foregoing description or following claims, what follows this phrase can be an additional step or entity, or a sub-step/sub-entity of a previously-recited step or entity.

What is claimed is:

1. A system comprising:
one or more computer processors; and
one or more non-transitory storage media storing instructions which, when executed by the one or more computer processors, cause performance of operations comprising:
receiving, at a master node in a distributed network architecture, a request to update a vehicle ledger associated with a first vehicle node of a plurality of vehicle nodes comprising the distributed network architecture;
in accordance with a determination that first criteria are met, updating the vehicle ledger, including:
generating an updated version of the vehicle ledger using vehicle data stored in a master ledger associated with the master node, wherein the vehicle data corresponds to a first vehicle associated with the first vehicle node, and wherein the master ledger is implemented using a blockchain that contains vehicle records for a plurality of vehicles associated with the distributed network architecture, the blockchain including a first block including the vehicle data corresponding to the first vehicle,
transmitting the updated version of the vehicle ledger to the first vehicle node, and
causing the first vehicle node to update a memory location in the first vehicle node corresponding to the vehicle ledger in the first vehicle node by replacing a current version of the vehicle ledger with the updated version of the vehicle ledger in the memory location of the first vehicle node; and
in accordance with a determination that the first criteria are not met, forgoing updating the vehicle ledger.

2. The system of claim 1, wherein:
the master ledger is a first copy of the blockchain;
the vehicle ledger is a second copy of the blockchain; and
the first criteria are met when the first copy of the blockchain and the second copy of the blockchain are not identical.

3. The system of claim 1, wherein receiving the request includes receiving a first version of the vehicle ledger stored at the first vehicle associated with the first vehicle node, the first version of the vehicle ledger including one or more changes to the vehicle data for the first vehicle that is not stored in the master ledger.

4. The system of claim 3, wherein a plurality of copies of the vehicle ledger are stored at the first vehicle, the operations further comprising:
in accordance with a determination that a majority of the copies of the vehicle ledger stored at the first vehicle include the one or more changes to the vehicle data for the first vehicle, initiating a process for evaluating the one or more changes to the vehicle data for the first vehicle.

5. The system of claim 3, the operations further comprising:
in accordance with a determination that second criteria are met, updating the master ledger to include the one or more changes to the vehicle data for the first vehicle; and
in accordance with a determination that the second criteria are not met, forgoing updating the master ledger to include the one or more changes to the vehicle data for the first vehicle.

6. The system of claim 5, wherein the second criteria are not met when the one or more changes to the vehicle data were made when the first vehicle was not in communication with the master node.

7. The system of claim 5, wherein the second criteria include a determination of whether the one or more changes are proposed by the master node.

8. The system of claim 5, wherein in accordance with a determination that the first criteria are not met, the processor is further configured to replace the first version of the vehicle ledger with the updated vehicle ledger.

9. The system of claim 1, wherein generating the updated version of the vehicle ledger using vehicle data stored in the master ledger includes adding vehicle data to the blockchain.

10. The system of claim 1, wherein the master ledger is remote from the first vehicle.

11. The system of claim 1, wherein the vehicle ledger includes vehicle data for the first vehicle that includes one or more items selected from the group consisting of: vehicle components, software for a respective vehicle component, and a revision level for the respective vehicle component.

12. The system of claim 1, wherein the request is sent from the first vehicle node in response to a detection of a predetermined event.

13. The system of claim 12, wherein the predetermined event is vehicle startup.

14. The system of claim 12, wherein the predetermined event is establishing a communication session between the first vehicle node and the first vehicle.

15. The system of claim 12, wherein the predetermined event is expiration of a predetermined amount of time.

16. The system of claim 1, the operations further comprising:
maintaining the master ledger using the blockchain that contains vehicle records for the plurality of vehicles associated with the distributed network architecture.

17. The system of claim 1, wherein the updated version of the vehicle ledger comprises a new vehicle ledger block, the operations further comprising:
verifying, at the master node, that the new vehicle ledger block is valid in accordance with one or more system requirements; and
in response to the new vehicle ledger block being valid, updating the master ledger by adding a new master ledger block corresponding to the new vehicle ledger block.

18. The system of claim 17, wherein the master node verifies that the new vehicle ledger block is valid in response to determining that the request to update the vehicle ledger occurs while the first vehicle is connected to the distributed network architecture.

19. The system of claim 17, further comprising transmitting, at the master node, a copy of the updated master ledger to the plurality of vehicle nodes.

20. The system of claim 17, further comprising transmitting, at the master node, a copy of the master ledger every time the first vehicle connects to the distributed network architecture.

21. The system of claim 1, wherein none of the plurality of vehicle nodes are allowed to update the master ledger.

22. The system of claim 1, further comprising causing the first vehicle node to store a plurality of copies of the vehicle ledger at different locations of the first vehicle.

23. A method for maintaining vehicle ledgers in a distributed network architecture, the method comprising:

receiving, at a master node in the distributed network architecture, a request to update a vehicle ledger associated with a first vehicle node of a plurality of vehicle nodes comprising the distributed network architecture;

in accordance with a determination that first criteria are met, updating the vehicle ledger, including:

generating an updated version of the vehicle ledger using vehicle data stored in a master ledger associated with the master node, wherein the vehicle data corresponds to a first vehicle associated with the first vehicle node, and wherein the master ledger is implemented using a blockchain that contains vehicle records for a plurality of vehicles associated with the distributed network architecture, the blockchain including a first block including the vehicle data corresponding to the first vehicle, transmitting the updated version of the vehicle ledger to the first vehicle node, and causing the first vehicle node to update a memory location in the first vehicle node corresponding to the vehicle ledger in the first vehicle node by replacing a current version of the vehicle ledger with the updated version of the vehicle ledger in the memory location of the first vehicle node; and in accordance with a determination that the first criteria are not met, forgoing updating the vehicle ledger.

24. A non-transitory computer-readable storage medium storing one or more programs configured to be executed by one or more processors, the one or more programs including instructions for:

receiving, at a master node in a distributed network architecture, a request to update a vehicle ledger associated with a first vehicle node of a plurality of vehicle nodes comprising the distributed network architecture;

in accordance with a determination that first criteria are met, updating the vehicle ledger, including:

generating an updated version of the vehicle ledger using vehicle data stored in a master ledger associated with the master node, wherein the vehicle data corresponds to a first vehicle associated with the first vehicle node, and wherein the master ledger is implemented using a blockchain that contains vehicle records for a plurality of vehicles associated with the distributed network architecture, the blockchain including a first block including the vehicle data corresponding to the first vehicle, transmitting the updated version of the vehicle ledger to the first vehicle node, and causing the first vehicle node to update a memory location in the first vehicle node corresponding to the vehicle ledger in the first vehicle node by replacing a current version of the vehicle ledger with the updated version of the vehicle ledger in the memory location of the first vehicle node; and in accordance with a determination that the first criteria are not met, forgoing updating the vehicle ledger.

25. The computer-readable storage medium of claim 24, wherein:

the master ledger is a first copy of the blockchain;
the vehicle ledger is a second copy of the blockchain; and
the first criteria are met when the first copy of the blockchain and the second copy of the blockchain are not identical.

26. The computer-readable storage medium of claim 24, wherein receiving the request includes receiving a first version of the vehicle ledger stored at the first vehicle associated with the first vehicle node, the first version of the vehicle ledger including one or more changes to the vehicle data for the first vehicle that is not stored in the master ledger.

* * * * *